United States Patent
Yaron et al.

(10) Patent No.: US 10,146,428 B2
(45) Date of Patent: Dec. 4, 2018

(54) DEVICE, SYSTEM, AND METHODS FOR ENTERING COMMANDS OR CHARACTERS USING A TOUCH SCREEN

(71) Applicant: INPRIS INNOVATIVE PRODUCTS FROM ISRAEL LTD, Efrat (IL)

(72) Inventors: Ben Etzion Yaron, Efrat (IL); Nissan Yaron, Efrat (IL)

(73) Assignee: INPRIS INNOVATIVE PRODUCTS FROM ISRAEL LTD, Efrat (IL)

( * ) Notice: Subject to any disclaimer, the term of this patent is extended or adjusted under 35 U.S.C. 154(b) by 0 days.

(21) Appl. No.: 15/241,381

(22) Filed: Aug. 19, 2016

(65) Prior Publication Data

US 2017/0010799 A1   Jan. 12, 2017

Related U.S. Application Data

(63) Continuation-in-part of application No. 14/976,005, filed on Dec. 21, 2015, now Pat. No. 9,459,795,
(Continued)

(51) Int. Cl.
G06F 3/0488   (2013.01)
G06F 3/041   (2006.01)
G06F 3/023   (2006.01)

(52) U.S. Cl.
CPC ........ *G06F 3/04883* (2013.01); *G06F 3/0233* (2013.01); *G06F 3/0416* (2013.01); *G06F 3/04886* (2013.01); *G06F 2203/04104* (2013.01)

(58) Field of Classification Search
CPC .................................................. G06F 3/04883
(Continued)

(56) References Cited

U.S. PATENT DOCUMENTS 5,642,108 A   6/1997   Gopher et al.
6,570,557 B1   5/2003   Westerman et al.
(Continued)

FOREIGN PATENT DOCUMENTS

WO   2010/016065   2/2010
WO   2010/051452   5/2010
WO   2017/029555   2/2017

OTHER PUBLICATIONS

International Search Report and Written Opinion for Application No. PCT/IB2016/001256 dated Mar. 17, 2017.
(Continued)

*Primary Examiner* — Jason C Olson
(74) *Attorney, Agent, or Firm* — The Dobrusin Law Firm, P.C.

(57) ABSTRACT

Disclosed is a method, device, and system for entry of command using a touch sensitive surface. Instead of the device providing predefined locations for entering different commands, the device identifies the locations of three or more of the user's fingers or other objects. After determining the locations of the fingers, an entry mode allows for the entry of one or more commands based on an association between the commands and movements of different fingers and the type or direction of movement. The association may include a first command associated with the sliding motion of only a first finger in a first direction and a second different command associated with the sliding motion of only a second finger in a second direction. The first and second directions may be the same (i.e., within about 30°, within about 20°, within about 15°, within about 10°, or within about 5°) or different (e.g., angled by more than 30°, angled by more than 40°, or angled by more than 50°). Preferably the command entry mode is triggered by a trigger event. Preferably one of the fingers remain on the touch sensitive
(Continued)

10 Simultaneous contact of touch sensitive surface with three or more fingers
12 Touch sensitive device
14 Touch sensitive surface
16 Point / region of contact of touch sensitive surface
24 Finger surface from the identification of the locations of the fingers through the entry of the command.

21 Claims, 15 Drawing Sheets

Related U.S. Application Data which is a continuation of application No. 13/091,158, filed on Apr. 21, 2011, now Pat. No. 9,261,972.

(60) Provisional application No. 62/207,564, filed on Aug. 20, 2015, provisional application No. 62/266,916, filed on Dec. 14, 2015.

(58) Field of Classification Search
USPC .......................................................... 345/173
See application file for complete search history.

(56) References Cited

U.S. PATENT DOCUMENTS

| | | | |
|---|---|---|---|
| 7,030,861 B1* | 4/2006 | Westerman | G06F 3/04883 345/173 |
| 8,436,828 B1 | 5/2013 | Zhai | |
| 8,624,855 B2* | 1/2014 | Weiss | G06F 3/04883 178/18.01 |
| 9,261,972 B2* | 2/2016 | Yaron | G06F 3/0233 |
| 9,268,483 B2* | 2/2016 | Dennis | G06F 3/04883 |
| 9,436,290 B2* | 9/2016 | Kang | G06K 9/00355 |
| 9,459,795 B2* | 10/2016 | Yaron | G06F 3/0233 |
| 9,465,532 B2* | 10/2016 | Trent, Jr. | G06F 3/04883 |
| 9,652,146 B2 | 5/2017 | Yaron et al. | |
| 2002/0160342 A1 | 10/2002 | Castro | |
| 2007/0177807 A1 | 8/2007 | Elias et al. | |
| 2008/0015115 A1 | 1/2008 | Guyot-Sionnest et al. | |
| 2008/0297482 A1 | 12/2008 | Weiss | |
| 2008/0320410 A1 | 12/2008 | Whytock et al. | |
| 2009/0237361 A1 | 9/2009 | Mosby et al. | |
| 2010/0289754 A1 | 11/2010 | Sleeman | |
| 2011/0210943 A1 | 9/2011 | Zaliva | |
| 2011/0234503 A1* | 9/2011 | Fitzmaurice | G06F 3/0235 345/173 |
| 2011/0291948 A1 | 12/2011 | Stewart et al. | |
| 2012/0007821 A1 | 1/2012 | Zaliva | |
| 2012/0162112 A1 | 6/2012 | Cho | |
| 2012/0212421 A1 | 8/2012 | Honji | |
| 2013/0050114 A1 | 2/2013 | Backman | |
| 2013/0194201 A1 | 8/2013 | Zanone et al. | |
| 2013/0321337 A1 | 12/2013 | Graham | |
| 2014/0028606 A1 | 1/2014 | Giannetta | |
| 2014/0160035 A1 | 6/2014 | Sauer et al. | |
| 2014/0300559 A1 | 10/2014 | Tanimoto et al. | |
| 2015/0160779 A1 | 6/2015 | Huang et al. | |
| 2015/0261330 A1 | 9/2015 | Jalali | |
| 2015/0338942 A1* | 11/2015 | Stone | G06F 3/0488 345/173 |
| 2016/0110095 A1* | 4/2016 | Yaron | G06F 3/0233 345/173 |
| 2016/0291833 A1 | 10/2016 | Ugawa | |
| 2016/0291862 A1 | 10/2016 | Yaron et al. | |
| 2016/0370989 A1 | 12/2016 | Yaron et al. | |
| 2017/0010799 A1 | 1/2017 | Yaron et al. | |
| 2017/0090600 A1 | 3/2017 | Yaron et al. | |

OTHER PUBLICATIONS

Copending U.S. Appl. No. 15/255,555, filed Sep. 2, 2016, published as US2016/0370989.

Copending U.S. Appl. No. 15/276,243, filed Sep. 26, 2016, published as US2017/0090600.

Copending U.S. Appl. No. 15/090,061, filed Apr. 4, 2016, published as US2016/0291862.

[Author unknown] How it works, Internal publication by Celluon, Inc. www.celluon.com, visited Mar. 31, 2011.

International Preliminary Report of Patentability for Application PCT/IB2016/001256 dated Feb. 20, 2018.

Non-Final Office Action for U.S. Appl. No. 15/276,243 dated Mar. 22, 2018.

Non-Final Office Action for U.S. Appl. No. 15/090,061 dated Jan. 12, 2018.

* cited by examiner

10 Simultaneous contact of touch sensitive surface with three or more fingers
12 Touch sensitive device
14 Touch sensitive surface
16 Point / region of contact of touch sensitive surface
24 Finger 17 Arch (e.g., natural arch of spaced apart fingertips)
20 Remove some or all of contacts (e.g., fingers) from the touch sensitive surface 16 Point / region of contact of touch sensitive surface (dashed circle)
18 Control location (e.g., finger contact region) (e.g., including the point / region of contact of the touch sensitive surface) (dashed oval)
22 Center of the control location (x)

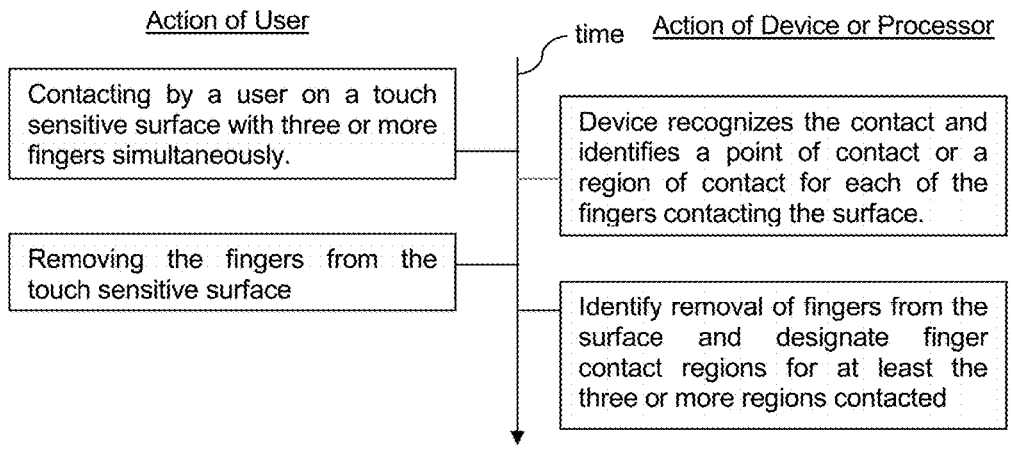
FIG. 9 - Initial Positioning of Control Locations
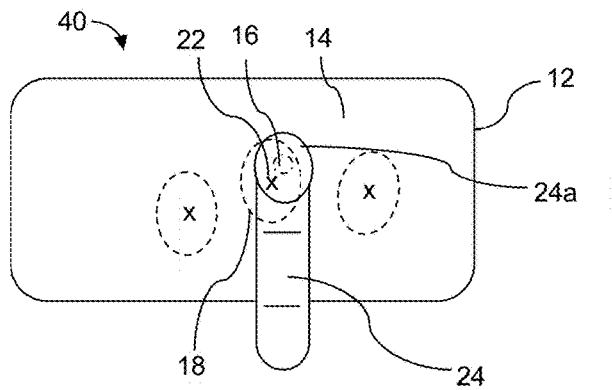
FIG. 10
12 Touch sensitive device
14 Touch sensitive surface
16 Point / region of contact of touch sensitive surface
18 Control location
22 Center of the Control location (e.g., center of the finger contact region)
24 Finger
24a Fingertip
40 Contacting touch sensitive surface after establishing finger contact regions 34 Gesture direction / sliding direction with finger(s) contacting the touch sensitive surface.

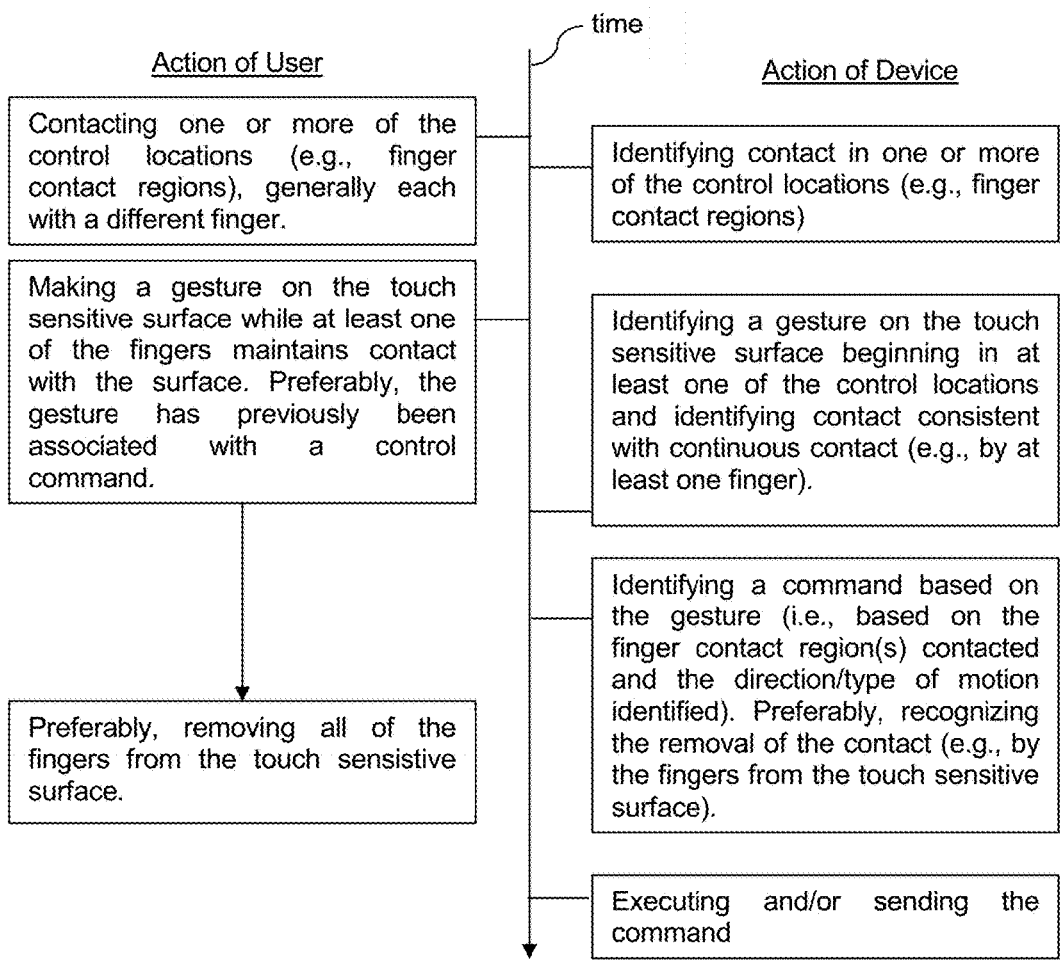
FIG. 12 – Entering a Command by a Gesture Including Contacting a Finger Contact Region 32 Direction for changing the finger contact region.
36 New control location (e.g., new finger contact region)
38 New center of control location (e.g., new finger contact region)

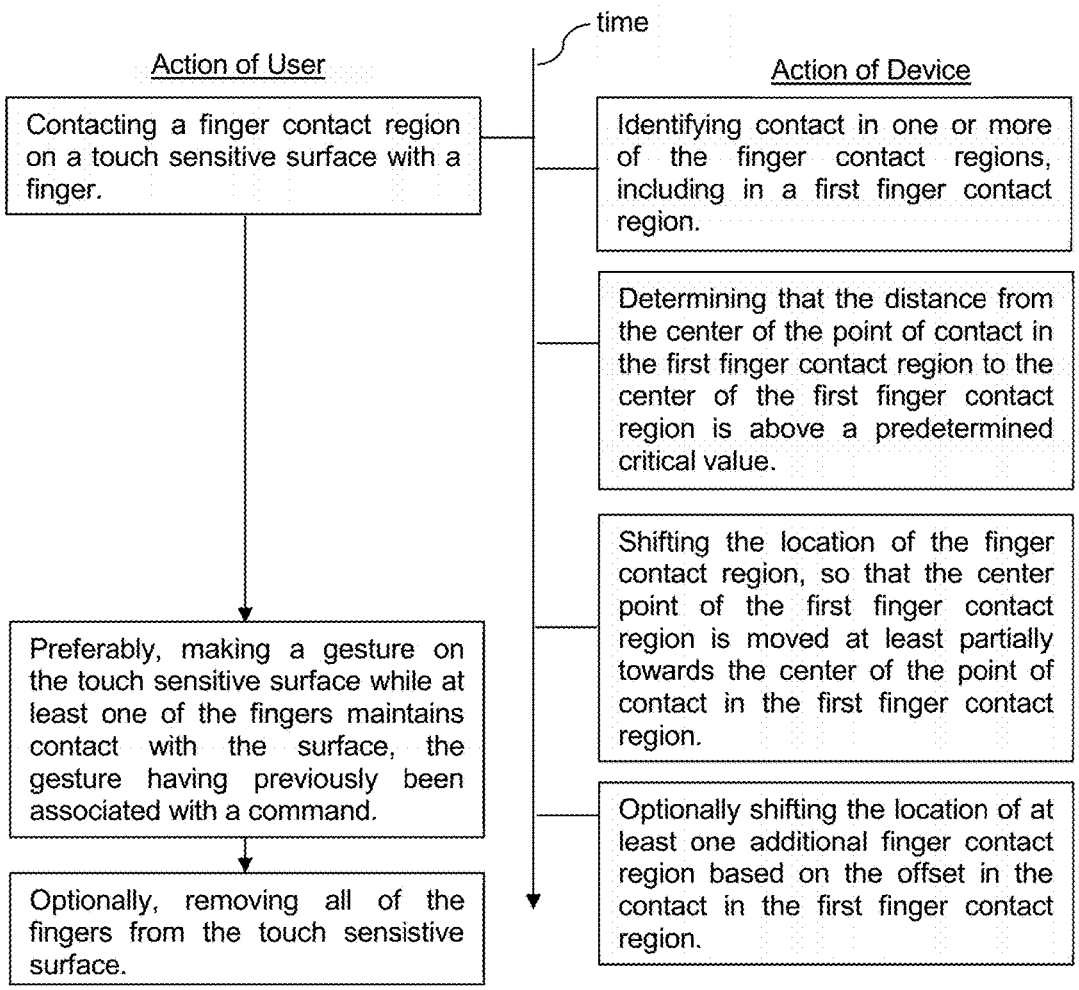
FIG. 14 – Repositioning a Finger Contact Region

DEVICE, SYSTEM, AND METHODS FOR ENTERING COMMANDS OR CHARACTERS USING A TOUCH SCREEN

CLAIM OF PRIORITY

The present application is a continuation-in-part of U.S. patent application Ser. No. 14/976,005 filed on Dec. 21, 2015 which is a continuation of U.S. patent application Ser. No. 13/091,158 filed on Apr. 21, 2011, now U.S. Pat. No. 9,261,971; and the present application further claims priority to U.S. Provisional Patent Applications 62/207,564 filed on Aug. 20, 2015 and 62/266,916, filed on Dec. 14, 2015. U.S. patent application Ser. Nos. 14/976,005 and 13/091,158 and U.S. Provisional Patent Applications 62/207,564 and 62/266,916 are all incorporated herein by reference in their entirety.

FIELD

The present teachings are directed at devices, systems, and methods for inputting one or more commands using a touch sensitive surface for control of an electronic device. Preferably, a positioning mode is employed for positioning control locations (e.g., finger contact regions) based on the contact of the touch sensitive surface with three or more fingers.

BACKGROUND

The ability to control devices using touch screen displays has often resulted in more intuitive and/or simplified operation of the device. However, in many circumstances there is a need to control a device when it is not safe, not possible or otherwise not efficient to see the touch screen device. In such circumstances, the user is essentially operating blind. One approach is to use textural clues to identify various control locations. As an example, typing on a keyboard is often facilitated by a surface marking on one or more character keys for positioning fingers and reducing errors in typing, particularly when typing blind (i.e., without looking at the results of the typing). However, typical touch screens do not have textural cues on the surface of screen. Instead, the typical touch screen display relies on the user's vision to identify and locate control locations. Blind typing on a touch screen display is difficult. Indeed, many individuals desiring to send messages on a mobile phone while having the phone hidden under a table or in a pocket, prefer phones having individual keys over a phone having a touch screen display. When touching keys, the operator receives continually feedback regarding the locations of the various keys (i.e., the control locations), such as by feeling spaces between keys, or by feeling a key having a different shape than a neighboring key.

Although touch screen display devices can be used as a control device, there is a need for improved methods and systems so that a touch screen device can be used as a control device in circumstances when it is required to operate blind.

Instead of giving textual clues, a touch screen device typically provides visual clues to identify the position of control locations on the surface.

Typical control locations are defined by an application. Although the operator may be able to move the control locations, such as by dragging a window, such movements typically requires an operator to first visually identify an initial location of the control location.

There are some applications which enable the entry of controls without requiring a control location to be identified. For example, when viewing photographs, various applicants allow the movement of two fingers at any location on the touch screen for enlarging, reducing, rotating, or shifting the location of the image. Here the number of possible controls is limited because the same operation occurs irrespective of which two fingers are being used and because there is no control location identified.

There is a need for methods, devices and systems that allow for control locations to be defined when a user contacts a touch screen surface instead of requiring the user to identify the position of existing control location(s) (e.g., through visual or tactile clues).

SUMMARY

Instead of requiring the user to identify the control locations (e.g., through visual clues), the control methods according to the present teachings allow for the control locations to be defined when the user contacts the touch screen surface, at the same time with 3, 4, or 5 fingers of a hand. Here, instead of having the user apply visual or tactile clues to recognize the control locations, the device moves or identifies (i.e., defines) the control locations based on the contact locations of the user's fingers. After contacting the touch sensitive surface with the 3, 4 or 5 fingers of a hand, some or all of the fingers may be removed and the control locations may be maintained until the user makes an input contact with the surface with 1, 2, 3, 4, or 5 fingers for controlling a device.

Disclosed is a method of entering a command comprising the steps of: i) a processor connected to a touch sensitive surface sensing a simultaneously positioning of three or more objects (e.g., fingers) above and near (e.g., within 10 mm of) or on the touch sensitive surface at three or more different sensing locations (e.g., consistent with the positioning by three or more fingers of a user), including a positioning centered at a first finger initial sensing point (e.g., by a first finger), a positioning centered at a second finger initials sensing point (e.g., by a second finger), and a positioning centered at a third finger initial sensing point (e.g., by a third finger); ii) the processor assigning a finger location region for two or more (e.g., each) of the three or more objects, wherein each finger location region is a distinct region of the touch sensitive surface, and each finger location region includes one of the initial finger sensing points (e.g. wherein each finger location region corresponds to one of the fingers); iii) the processor entering a command entry mode following the step of assigning the finger location regions (e.g., following a predetermined event such as the removal of at least one finger, or following a predetermined time interval), wherein the command entry mode includes an association having at least a first command associated with a movement of only one of the objects starting at a first finger location region and a second different command associated with a movement (e.g., the same movement or a different movement as employed with the first command) of only one of the objects starting at a second finger location region; and iv) the processor recognizing a gesture on the touch sensitive surface including sensing the movement of only one of the objects starting at the first finger location region and identifying the associated first command based on the gesture.

Also disclosed is a method of entering a command comprising the steps of: identifying a simultaneously contacting on a touch sensitive surface at three or more locations (e.g., consistent with the contact by three or more fingers of a user), including a contact centered at a first finger initial contact point (e.g., by a first finger), a contact centered at a second finger initial contact point (e.g., by a second finger of a second finger), and a contact at a third finger initial contact point (e.g., by a third finger); assigning a control location (e.g., a finger contact region) for each of the three or more fingers, wherein each finger contact region is a different region of the touch sensitive surface, and each finger contact region includes one of the initial contact points (e.g. wherein each finger contact region corresponds to one of the fingers); and recognizing the removing of the contact of the touch sensitive at the three or more locations (e.g., the removal of the three or more fingers from the touch sensitive surface). After control locations are assigned and removal of the contacts are sensed, the process may include one or more steps of entering a control command by contacts (i.e., entry contacts) with one or more control locations. For example, the process may include recognizing the simultaneous entry contact(s) in one or more of the finger contact regions (e.g., the simultaneously contacting of one or more of the finger contact regions with the corresponding finger) each at an entry contact point; recognizing a gesture on the touch sensitive surface including a movement of the entry contact in one or more directions on the touch sensitive surface starting from the entry contact point while continuous entry contact is maintained; (e.g., from a motion on the touch sensitive surface by the user making a gesture on the touch sensitive surface with one or more of the fingers in contact with touch sensitive surface, wherein each gesture originates in the corresponding finger contact region); and identifying a command to execute based on the control locations contacted and the gestures originating in the control locations.

Further disclosed is a method of entering a command using a processor connected to a touch sensitive surface comprising the steps of: (i) the processor identifying a simultaneously contact on the touch sensitive surface at three or more contact locations (e.g., consistent with the contact by three or more fingers of a user), including a contact centered at a first finger initial contact point (e.g., by a first finger), a contact centered at a second finger initial contact point (e.g., by a second finger of a second finger), and a contact centered at a third finger initial contact point (e.g., by a third finger); (ii) the processor assigning a finger contact region for each of the three or more fingers, wherein each finger contact region is a different region of the touch sensitive surface, and each finger contact region includes one of the initial contact points (e.g. wherein each finger contact region corresponds to one of the fingers); (iii) the processor recognizing the removing of the contact of the touch sensitive surface at one or more (e.g., all) of the contact locations (e.g., the removal of the one, two, three or all of the fingers from the touch sensitive surface); (iv) following the step of recognizing the removing of contact(s) the processor recognizing the simultaneous entry contact(s) in one or more of the finger contact regions (e.g., the simultaneously contacting of one or more of the finger contact regions with the corresponding finger) each at an entry contact point, and/or the processor recognizing one or more contacts from step (i) each remaining on a finger contact region and recognizing the remaining contacts as finger entry contact(s); (v) the processor recognizing a gesture on the touch sensitive surface including a movement of the entry contact in one or more directions on the touch sensitive surface starting from the entry contact point while continuous entry contact is maintained; (e.g., from a motion on the touch sensitive surface by the user making a gesture on the touch sensitive surface with one or more of the fingers in contact with touch sensitive surface, wherein each gesture originates in the corresponding finger contact region); and (vi) the processor identifying a command to be execute based on the finger contact regions that are contacted and the gestures originating in the finger contact regions.

Additionally disclosed is a method of entering a control command comprising the steps of: simultaneously contacting a touch sensitive surface with three or more fingers of a user, including a contact of a first finger centered at a first finger initial contact point, a contact of a second finger centered at a second finger initial contact point, and contact of a third finger at a third finger initial contact point; assigning a finger contact region for each of the three or more fingers, wherein each finger contact region is a different region of the touch sensitive surface, and each finger contact region includes one of the initial contact points, wherein each finger contact region corresponds to one of the fingers; removing the three or more fingers from the touch sensitive surface; contacting one of the finger contact regions with the corresponding finger and sliding said finger in one or more finger movement directions. For example, the sliding of finger may control a device, a component of a device, a communication, a display, or any combination thereof. By way of example, the movement direction of the finger may result in the moving of a cursor in a corresponding one or more cursor movement directions.

Also disclosed is a method of entering a command comprising the steps of: simultaneously contacting a touch sensitive surface with three or more fingers of a user, including a contact of a first finger centered at a first finger initial contact point, a contact of a second finger centered at a second finger initial contact point, and contact of a third finger at a third finger initial contact point; assigning a finger contact region for each of the three or more fingers, wherein each finger contact region is a different region of the touch sensitive surface, and each finger contact region includes one of the initial contact points, wherein each finger contact region corresponds to one of the fingers; and removing the three or more fingers from the touch sensitive surface. After establishing finger contact regions based on the positions of contact by the user, one or more gestures may be entered using the finger contact regions. The entry of a gesture may include simultaneously contacting one or more of the finger contact regions with the corresponding finger; making a gesture on the touch sensitive surface with one or more of the fingers in contact with touch sensitive surface, wherein each gesture originates in the corresponding finger contact region; and identifying a control command to execute based on the finger contact regions that are contacted and the gestures originating in the finger contact regions.

The control locations (e.g., finger location regions or finger contact regions) may be static or dynamic. For example, a static finger contact region may remain fixed while in a command entry mode, and may change only after ending a command entry mode and initiating a new positioning mode.

Preferably the control locations are finger location regions. Finger location regions typically are spaced apart in an arc, such as expected from the spacing of finger tips. Although the finger location regions may be identified by the sensing of objects near the touch sensitive surface (e.g., fingers slightly above the surface, typically within 10 mm of the surface), the finger location regions preferably are finger contact regions, where the objects contact the surface. while near the touch sensitive surface.

Preferably, the control locations (e.g., finger location regions or finger contact regions) are dynamic. For example, after one or more contacts during a command entry mode, a finger location region may be repositioned based on the actual location of finger position or contact (e.g., within a control location) during the command entry mode.

A first finger location region (e.g., finger contact region) may be characterized by an initial contact area and an initial center point (e.g., a geometric center of the initial contact area). During a command entry mode, the touch surface may be contacted in the initial contact area, but the center of the contact may be at a contact point offset from the initial center point. The center point for the first finger contact region may then be shifted at least partially towards (e.g., entirely to) the contact point, so that the first finger contact region is characterized by a new center point different from the initial center point. In addition to shifting the center point of the first finger contact region, the offset between a center point and a center of contact in one finger contact region may also be employed for repositioning one or more different finger contact regions. Such repositioning may be employed to compensate for gradual shifting of the position of a hand on a touch sensitive surface. As such, the device adjusts to the user's hand position instead of the user adjusting the hand to a fixed position of a device.

Another aspect of the teachings herein is directed at a system for entry of control commands for controlling a device comprising: an entry device including a touch sensitive surface; a processor; a memory storing instruction that, when executed by the processor causes the processor to: identify a simultaneously contact on the touch sensitive surface at three or more locations (e.g., consistent with the contact by three or more fingers of a user), including a contact centered at a first finger initial contact point (e.g., by a first finger), a contact centered at a second finger initial contact point (e.g., by a second finger of a second finger), and contact at a third finger initial contact point (e.g., by a third finger); assign a control location (e.g., a finger contact region) for each of the three or more fingers, wherein each control location is a different region of the touch sensitive surface, and each control location includes one of the initial contact points (e.g. wherein each finger contact region corresponds to one of the fingers); and recognize the removing of the contact of the touch sensitive at the three or more locations (e.g., the removal of the three or more fingers from the touch sensitive surface) before or after the step of assigning the control locations. The memory storing instruction, when executed, after the assignment of the control locations may also cause the processor to: recognize the simultaneous entry contact(s) in one or more of the control locations (e.g., the simultaneously contacting of one or more of the finger contact regions with the corresponding finger) each at an entry contact point; recognize a gesture on the touch sensitive surface including a movement of the entry contact in one or more directions on the touch sensitive surface starting from the entry contact point while continuous entry contact is maintained; (e.g., from a motion on the touch sensitive surface by the user making a gesture on the touch sensitive surface with one or more of the fingers in contact with touch sensitive surface, wherein each gesture originates in the corresponding finger contact region); and identify a command to be execute based on the control locations that are contacted and the gestures originating in the control locations.

In another aspect, the teachings herein is directed at a machine readable storage medium containing instructions that when executed cause a processor of an electronic device to discern input control commands by: the processor identifying a simultaneously contact on the touch sensitive surface at three or more locations (e.g., consistent with the contact by three or more fingers of a user), including a contact centered at a first finger initial contact point (e.g., by a first finger), a contact centered at a second finger initial contact point (e.g., by a second finger of a second finger), and contact at a third finger initial contact point (e.g., by a third finger); the processor assigning a control location (e.g., a finger contact region) for each of the three or more finger initial contact points, wherein each control location is a different region of the touch sensitive surface, and each control location includes one of the initial contact points (e.g. wherein each finger contact region corresponds to one of the fingers); the processor recognizing the removing of the contact of the touch sensitive at the three or more locations (e.g., the removal of the three or more fingers from the touch sensitive surface); the processor recognizing the simultaneous entry contact(s) in one or more of the finger contact regions (e.g., the simultaneously contacting of one or more of the finger contact regions with the corresponding finger) each at an entry contact point; the processor recognizing a gesture on the touch sensitive surface including a movement of the entry contact in one or more directions on the touch sensitive surface starting from the entry contact point while continuous entry contact is maintained; (e.g., from a motion on the touch sensitive surface by the user making a gesture on the touch sensitive surface with one or more of the fingers in contact with touch sensitive surface, wherein each gesture originates in the corresponding finger contact region); and the processor identifying a command to be execute based on the control locations contacted and the gestures originating in the control locations.

In yet another aspect, the teachings herein are directed at methods, systems and devices for unlocking one or more electronic device controls by a processor comprising: receiving an indication of simultaneous contact at multiple locations on a touch sensitive surface; determining that the multiple locations have a spacing consistent with contact of the touch sensitive surface by one or two hands of a user; assigning multiple finger contact regions based on the multiple locations of simultaneous contact; receiving indications of a sequential series of contacts each with one or more of the finger contact regions; comparing the sequential series of contacts with a predetermined sequential series (i.e., a password series), and unlocking one or more controls when the sequential series of contacts matches the predetermined sequential series.

BRIEF DESCRIPTION OF DRAWINGS

FIG. 9 is a drawing showing features of a process of assigning initial finger contact regions.

FIG. 10 is an illustrative drawing showing a contact of the touch sensitive surface in one of the finger contact regions.

FIG. 12 is an illustrative drawing showing features of a process of entering a command by a gesture including contacting a finger contact region.

FIG. 14 is an illustrative drawing showing features of a process of repositioning a finger contact region.

DETAILED DESCRIPTION

The explanations and illustrations presented herein are intended to acquaint others skilled in the art with the invention, its principles, and its practical application. Accordingly, the specific embodiments of the present disclosure as set forth are not intended as being exhaustive or limiting. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The method, systems, devices and apparatus for the control sessions according to the teachings herein are generally based on a processor identifying contacts with a touch sensitive surface, resulting in the selection of one or more control command.

Figure 1:
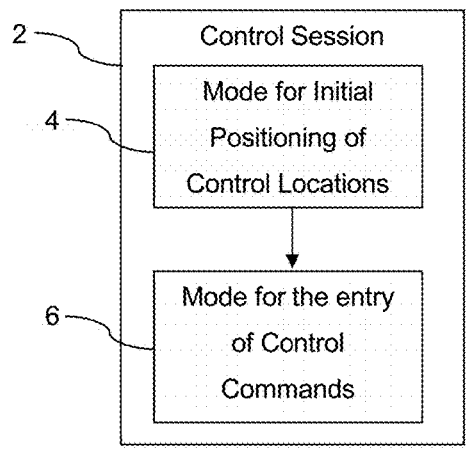
FIG. 1 is a drawing showing illustrative modes for a control session according to the teachings herein.
Figure 2:
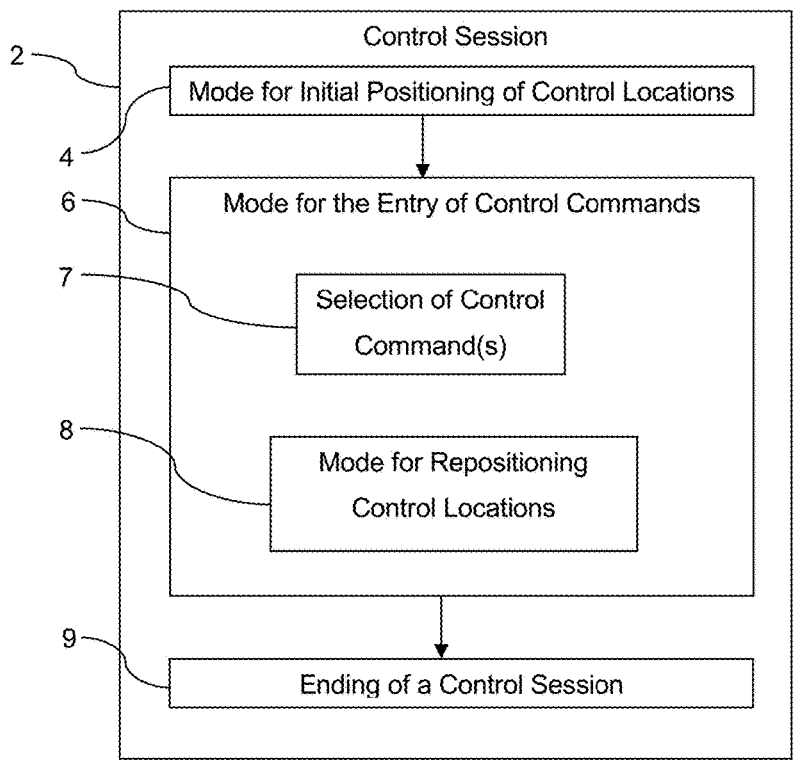
FIG. 2 is a drawing showing illustrative modes for a control session according to the teachings herein.

With reference to FIG. 1, a control session 2 typically includes a mode for initial positioning of control locations 4 (e.g., finger contact regions) on a touch sensitive surface 14. The mode for initial positioning of control locations preferably is employed for positioning the control locations based on the locations of simultaneous contact at three or more spaced apart locations on the touch sensitive surface (e.g., by three or more fingers contacting the surface). After the control locations are assigned, the control session 2 includes a mode for entry of control commands 6. The mode for entry of control commands is employed for selecting one or more control commands 8 based on contact(s) with the control locations on the touch sensitive surface 14. The control session may include a mode for ending the control session. The control session may include a mode for repositioning control locations. Such a repositioning mode may be employed to compensate for shifting of a user's hand relative to the touch sensitive surface. The mode for the entry of control commands 6 may include the selection of control commands 7 and a mode for repositioning control locations 8, such as illustrated by FIG. 2. The ending of a control session 9 may occur after the mode for the entry of control commands 6.

Throughout the entire duration of the control session, the processor is preferably in electronic communication with the touch sensitive surface for identifying positions of objects above or in contact with the touch sensitive surface, for identifying movement of objects above or the movement of contacts on the surface, and for identifying the removal of the objects away from the touch sensitive surface (e.g., removal of one or more contacts from the surface).

By employing a mode for initial positioning of control locations, the processor positions or assigns the control locations based on the positions of contact by a user, thus enabling "blind" interaction by a use with the touch sensitive surface.

It will be appreciated from the description herein that the methods, devices, systems, and apparatuses according to the present teachings rely on contacts with one or more touch sensitive surfaces, and more preferably with a processor receiving indications of contact with the touch sensitive surface(s).

The methods, devices, and systems according to the teachings herein may employ one or more of the features described in U.S. patent application Ser. No. 13/091,158 filed on Apr. 21, 2011, and U.S. Provisional Patent Application No. 62/142,170, filed on Apr. 2, 2015 entitled SYSTEM, APPARATUS AND METHOD FOR VEHICLE COMMAND AND CONTROL, both incorporated herein by reference in their entirety.

Touch Sensitive Surface

The methods and systems according to the teachings herein may employ a touch sensitive surface as a component in an input device for inputting commands. As used herein, a touch sensitive surface is capable of identifying the location of multiple simultaneous contacts on the surface. Each contact preferably includes a sufficient force applied to the surface as required by the touch sensitive surface to recognize a contact. The touch sensitive surface may be a flat surface, may be a curved surface, or may have regions that are flat and regions that are curved. Preferably the touch sensitive surface is characterized as being generally smooth and or having a generally uniform texture. For example, the touch sensitive surface may be sufficiently smooth and/or have a sufficiently uniform texture so that a user cannot identify the location of contact of the surface based on the surface topography or other tactile clues on the surfaces.

The touch sensitive surface may be a surface of a pure entry component or device (i.e., a component or a device that does not display images), such as a touch pad, or may be a surface of a combination entry/display component or device, such as a touch-screen display.

The device including the touch sensitive surface and/or a processor connected to the device preferably is capable of recognizing each of multiple contacts to the surface, the maintaining of the contact, the movement (if any) of the contact, and the termination (i.e., removal) of the contact.

Figure 3:
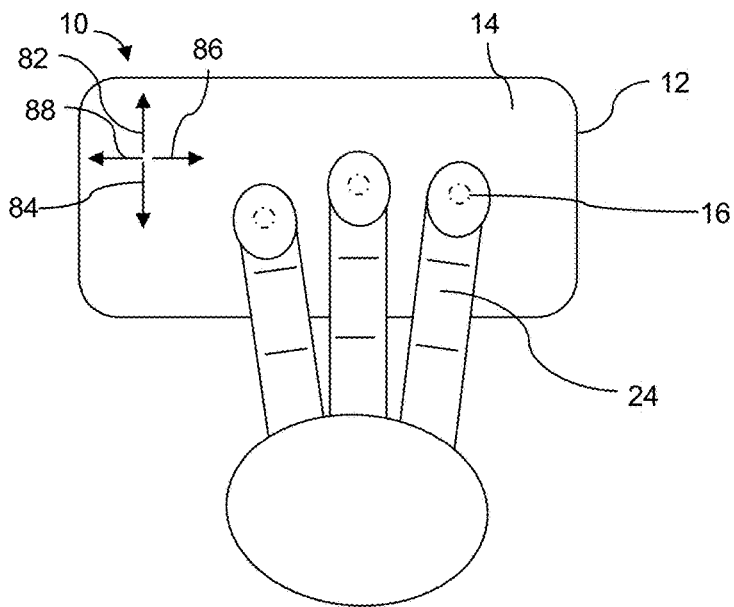
FIG. 3 is a drawing illustrating simultaneous contact on a touch sensitive surface at three or more locations (e.g., corresponding to the touching by three or more fingers of a hand).

An illustrative touch sensitive surface is shown in FIG. 3. With reference to FIG. 3, the touch sensitive surface 14 may have a first direction 82 (e.g., an upward direction) and an opposing second direction 84 (e.g., a downward direction). The touch sensitive surface may have a third direction 86 (e.g., a rightward direction) and an opposing fourth direction 88 (e.g., a leftward direction). The first and second directions 82, 84 may be generally orthogonal to the third and fourth 86, 88 directions. When describing the directions as upward, downward, rightward and leftward, it will be appreciated that the descriptions refer to the first, second, third and fourth directions, and may have alternate meanings depending on the actual orientation of the touch sensitive surface. For example, when a touch sensitive surface is oriented on a horizontal plane, the upward and downward directions may in actuality refer to a forward direction and a backward direction respectively.

Mode for Initial Positioning of Control Locations (e.g., Finger Contact Regions)

The initial positioning of the control locations (e.g., finger contact regions) according to the teachings herein typically requires the simultaneous contact of a touch sensitive surface at three or more points or regions. The three or more points of contact preferably are consistent with the contact by three or more fingers of a hand or hands. The number of simultaneous contacts required for the initial position of the control locations may be 3 or more, 4 or more, 5 or more, 6 or more, 7 or more, 8 or more, 9 or more, or 10. Preferably the number of simultaneous contacts on the touch sensitive surface is a predetermined target number or a predetermined minimum number. For example, if there is a predetermined target number of four, the positioning of the control locations will not be completed until precisely four simultaneous contacts are recognized on the touch sensitive surface. In contrast, if the predetermined minimum number of contacts of four, the positioning of the control locations will not be completed until at least four (e.g., four, five, six, eight, or more) simultaneous contacts are recognized on the touch sensitive surface.

FIG. 3 illustrates the simultaneous contact of a touch sensitive surface 14 at three or more spaced apart locations 16 on a touch sensitive surface of a touch sensitive device 12 (e.g., a pure input device).

Figure 4:
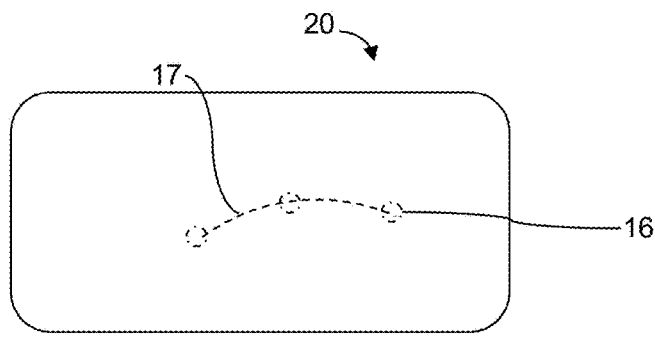
FIG. 4 is a drawing illustrating a touch sensitive surface showing the contacts removed (e.g., the fingers removed from the surface) and showing the locations of the prior simultaneous contact.

The simultaneous contacts of the touch sensitive surface preferably are spaced apart on the surface in such a manner that sequential finger locations may be assigned. For example, the positions of the contacts may relate to a natural arch (or arches) formed by the fingertips of one hand. With reference to FIG. 4, the positions of the contacts 16 may be along an arch 17, such as a natural arch corresponding to three or more adjacent fingertips.

In the mode of the initial positioning of the control locations, the process typically includes a step of a user removing some or preferably all of the fingers from the touch sensitive surface. As such, the processor, after identifying the simultaneous contact of three or more spaced apart locations, will then identify the removal (i.e., the absence of contact) at the three or more spaced apart locations). Preferably the processor recognizes the removal of all contact with the touch sensitive surface, such as illustrated in FIG. 4. It will be appreciated that one or more of the fingers may remain in contact with the touch sensitive surface after the initial positioning of the control locations (provided that at least one finger has been removed from the surface, and preferably at least two fingers have been removed from the surface). Such remaining finger(s) may be employed in directly entering a control compound as discussed herein, without the need to remove said finger(s) and re-establish contact with the surface.

Figure 5:
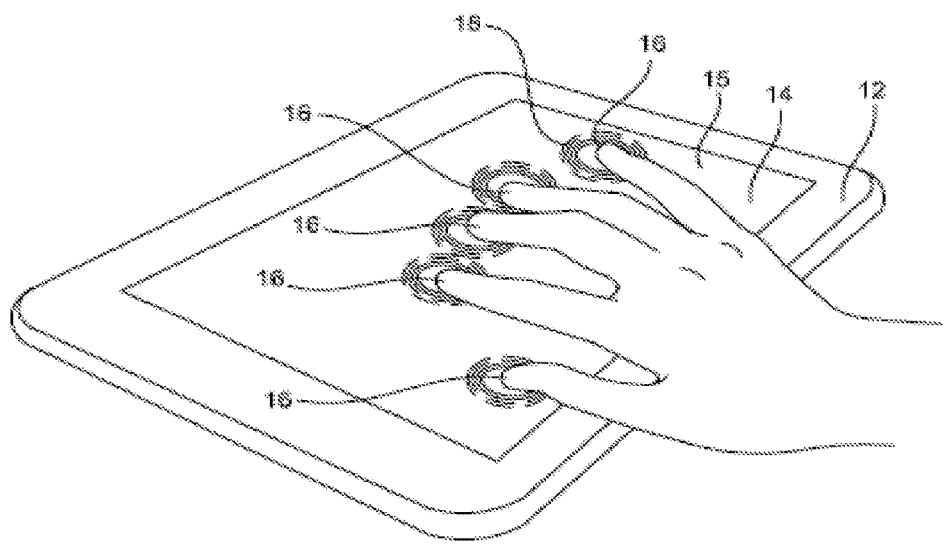
FIG. 5 is a drawing illustrating simultaneous contact of a touch sensitive surface with all 5 fingers of a hand.

With reference to FIG. 5, the initial positioning of the control locations may include simultaneous contact with four or more fingers (for example with all the fingers of one hand). As illustrated by FIG. 5, the touch sensitive surface may be a touch screen display 15. As such, the locations of initial contact, regions including the location of initial contact, or the resulting control location 18 may be displayed on the touch sensitive screen display.

Figure 6:
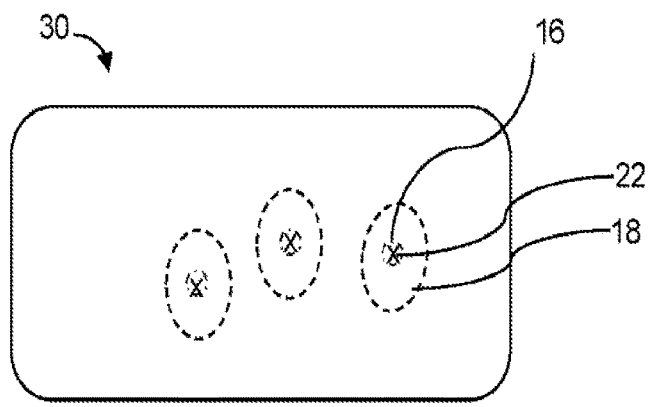
FIG. 6 is a drawing illustrating command control location (e.g., finger contact regions) assigned to the touch sensitive surface based on the locations of the simultaneous contacts.

FIG. 6 illustrates control locations after being positioned in the mode of initial positioning of the control locations. Each control location 18 is spaced apart from the other control locations. Each control location may be characterized by a geometric center 22. The position or region of contact 16 preferably is positioned within the control location 18. The geometric center 22 is preferably within the position or region of contact 16. The control locations may be a region having any shape. For example, the shape of a control location may be polygonal, circular, semi-circular, rectangular, oval shaped, elliptical, egg-shaped, or square. With reference to FIG. 6, each position on the touch sensitive surface is associated with at most one control location 18.

Figure 7:
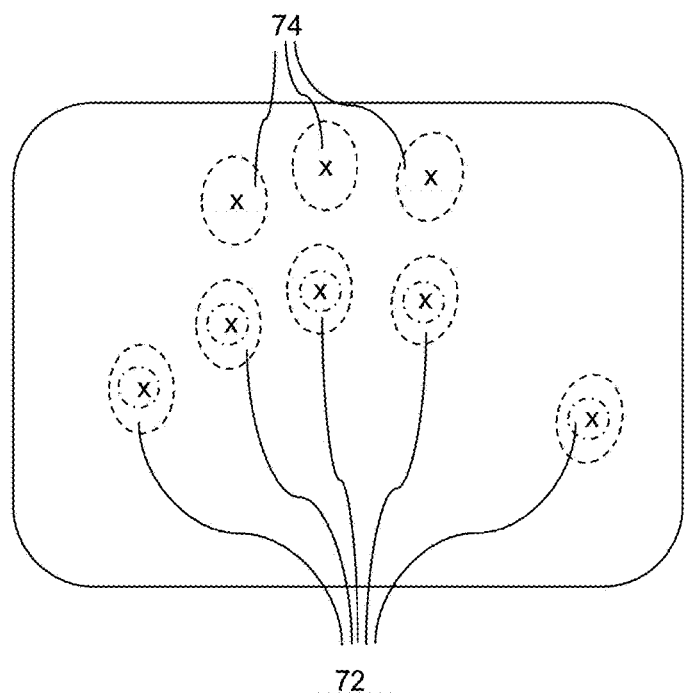
FIG. 7 is an illustrative drawing of a touch sensitive surface having both base finger contact regions and secondary finger contact regions.
Figure 8:
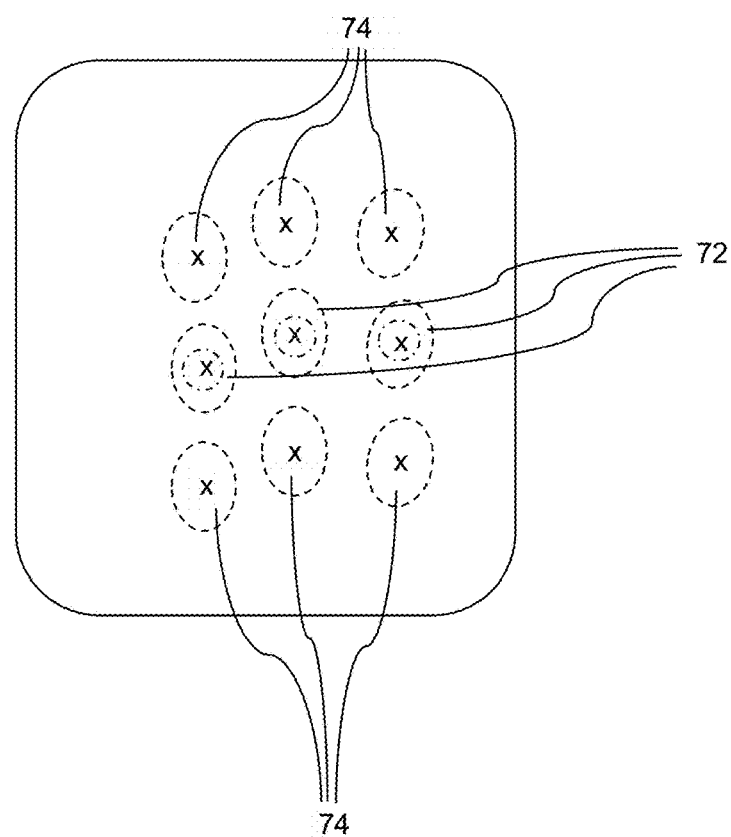
FIG. 8 is an illustrative drawing of a touch sensitive surface having both base finger contact regions and secondary finger contact regions. For example, a base finger contact may and two secondary finger contact regions may be controlled by the same finger.

The number of control locations (e.g., finger contact regions) may be more than the number of fingers that are employed when initially establishing the locations of the finger contact regions. For example, there may be a base finger contact region for a first finger and one or more secondary finger contact regions for the first finger. The base finger contact region may include the point of contact of the finger when defining the finger contact regions. Each secondary finger contact region (if any) for the first finger is sufficiently displaced from the base finger contact region for the first finger so that the base and secondary finger contact regions do not overlap. It will be appreciated that the locations of the various finger contact regions for a first finger may depend upon different amounts of curvature of the first finger. For example the first finger may be relatively curved when contacting the base finger contact region and relatively less curved (e.g., more outstretched when contacting a secondary finger contact region). This may be analogous to typing a "d" (relatively curved) and an "e" (relatively outstretched) on a QWERTY keyboard. As another example, the first finger may be relatively less curved when contacting the base finger contact region and relatively more curved when contacting a secondary finger contact region. This may be analogous to typing a "d" (relatively less curved) and a "c" (relatively more curved) on a QWERTY keyboard. Examples of a touch screen surface including base finger contact regions 72 and secondary finger contact regions 74 are shown in FIG. 7 and FIG. 8. In FIG. 7, there are 5 base finger contact regions (one for each finger of a hand) and 3 secondary finger contact regions (one for each of three of the fingers). In FIG. 8, there is one base finger contact region 72 and two secondary finger contact regions 74 for each of three fingers.

Each finger contact region preferably is a different region of the touch sensitive surface. As such, any location on the touch sensitive surface may correspond to at most one finger contact region at a given time. It will be appreciated that some regions of the touch sensitive surface will correspond with no finger contact region. According to the teachings herein, the finger contact region associated with a given location may change over time. For example, a location p on the touch sensitive surface may be associated with a one finger contact region after a first stage of positioning finger contact regions and may be associated with a different finger contact region after a later stage of positioning finger contact regions. As another example, after one or more entry contacts in a finger contact region that are offset from the center of that finger contact region, a location p on the touch sensitive surface that was initially associated with that finger contact region may no longer be associated with it (instead, p may be associated with no finger contact region or may be associated with a different finger contact region).

Features of a process for positioning initial control locations is illustrated in FIG. 9. The process may be recognized from the actions of a user of a touch sensitive device, from the actions of a device or a processor, or both. The actions of the user may include: a step of a user simultaneously contacting a touch sensitive surface with three or more fingers; and after contacting the touch sensitive surface, a step of the user removing the three or more fingers from the touch sensitive surface. The actions of the device or processor may include a step of recognizing a simultaneous contact on the touch sensitive surface at three or more spaced apart contact point or contact regions (e.g., consistent with the contact by fingers of a user's hand(s)); followed by a step of recognizing the removal of the contacts from the touch sensitive surface and the positioning of control locations (e.g., finger contact locations) based on the locations contacted. It will be appreciated that the positioning of the control locations may occur at any time after the device or processor recognizes the simultaneous contacts. For example, the positioning of the control location may be before the removal of the contacts. As illustrated in FIG. 9, the positioning of the control location may occur after recognizing the removal of the contacts. As such, the positioning of the control locations may be based on the initial position of contact, or a later (e.g., a final) position of contact in the event the contact moves during the mode of positioning the control locations.

Mode for Entry of Control Commands

After establishing initial command locations on the touch sensitive surface, the touch sensitive surface may be employed in a mode for entry of control commands.

The touch sensitive surface may be employed for controlling multiple devices and/or controlling multiple features or functions of the device(s). As such, the processor may need to identify which device/feature/function to control with a control command. The selection of the control command(s) may be based on the control location or locations contacted during a mode for entry of control commands. In order to increase the number of different possible commands that can be entered, one or any combination of the following features of a contact with the surface may be identified and used by the processor: the number of contact locations being contacted, a sliding motion of a contact, a direction of motion of a contact, the length of time of a contact, the number of sliding motions of a contact, and the removal of a contact. By using different types of gestures by a user, and recognizing the gestures by a processor, the problem of needing to select a control command from a large number of different commands with relatively few fingers is solved.

The process may include entering a control command by a user making one or more gestures on a touch sensitive surface and a processor recognizing the gesture(s) and selecting the control command based on a predetermined association between the gestures and the control commands.

Typically one or more fingers remain in contact with the touch sensitive surface during the entry of the command.

The gesture may be any gesture which can be recognized by the processor. Preferably, a gesture begins by a contact at one or more of the control locations. A user may start enter a gesture by contacting the touch sensitive surface with one finger beginning in a finger contact region and, while maintaining the contact, making one or more sliding motions with the finger including sliding the finger in at least a first direction, and then removing the one finger from the touch sensitive surface. For example, a single finger may contact a finger contact region, then slide in one or any combination of the following directions: upwards, downwards, rightwards, and left wards, and then removing the finger from the touch sensitive surface. It will be appreciated that after moving in a first direction, a finger may be moved in the reverse direction prior to removing the finger from the touch sensitive surface.

Contacting the touch sensitive surface with one finger in a finger contact region and then making one or more contacts with the touch sensitive surface with a second finger, and then removing the one finger from the touch sensitive surface. The contact with a second finger may be a sliding contact, a tapping contact, or a contact maintained at a single location.

A first finger maintains in a constant location on the touch sensitive surface while a second finger makes a dynamic contact with the touch sensitive surface. The entry of the command preferably ends with the removal of the first finger from the touch sensitive surface.

Contacting the touch sensitive surface with two fingers, each in a different finger contact region, and moving at least one of the fingers in a first direction. Preferably moving both fingers in the same direction or moving the two fingers towards each other.

It will be appreciated that the control of a device may include a plurality of gesture entries. For example, the process may require the entry of a first control command to select a device to control and a later entry of a control command to control a function of the device.

The distance of movement and/or the length of contact may be employed for determining the level or extent of control of a device. For example, in controlling the speed of a device, movement in one direction may be employed to increase the speed continuously until the end of the gesture is recognized (e.g., by removing the contact or other entry completions according to the teachings herein). The rate of increase of the speed may be related to the distance of movement of the gesture. As another example, the volume of a device may be controlled by the gesture originating at a control location. The movement of the contact in a first direction by a first movement distance may result in the volume increasing by at a rate that correlates with the first movement distance. The increase in volume may continue until the contact is removed or the completion of the gesture is otherwise identified. The decrease of the volume may be similarly be accomplished by a contact in a second direction different from the first direction (e.g., an opposing direction) by a second movement distance.

With reference to FIG. 10, the entry of a gesture may include a contact 40 on the touch sensitive surface at a point or region 16 within a control location 18 after the control locations have been established. The point or region of contact 16 may be offset from the center of the control location 22, such as shown in FIG. 10. The point or region of contact may include the center of the control location (not shown).

Figure 11A:
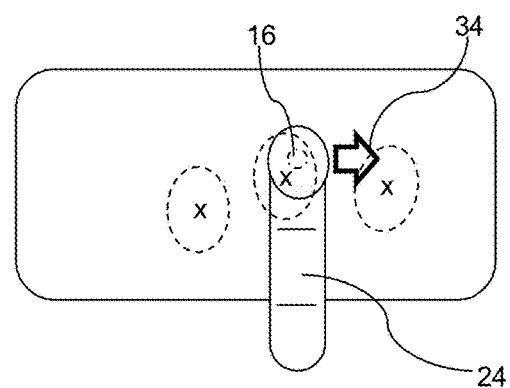
FIG. 11A is an illustrative drawing showing a sliding motion of the contact with the touch sensitive surface in a generally rightward direction.
Figure 11B:
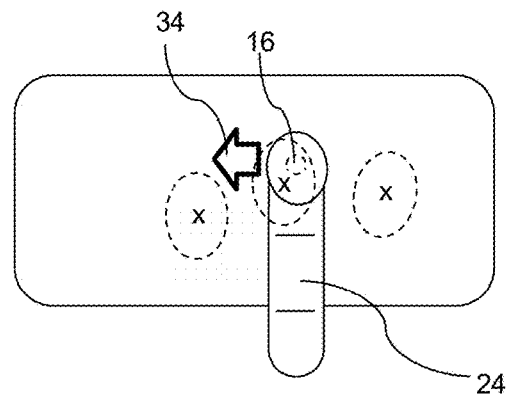
FIG. 11B is an illustrative drawing showing a sliding motion of the contact with the touch sensitive surface in a generally leftward direction.
Figure 11C:
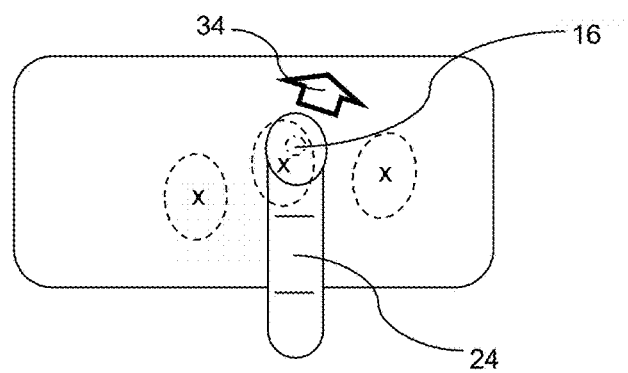
FIG. 11C is an illustrative drawing showing a sliding motion of the contact with the touch sensitive surface in a generally upward direction (e.g., within about 45° or within about 30° of the upward direction).

The gesture may include a movement of one or more of the contacts. The movement may be a sliding movement in one or more sliding directions. For example, the gesture may include a movement of the contact 16 on the touch sensitive surface in a generally rightward direction (FIG. 11A), in a generally leftward direction (FIG. 11B), in a generally upward direction (FIG. 11C), or in a generally downward direction. It will be appreciated that a sliding movement may include movement in multiple directions and/or movement is non-linear. The entering of a command using a gesture may include multiple contacts each with a different control location. Each contact may include a movement in the same sliding direction, may include movements in different direction, or may include both contacts that are stationary and contacts that move. Preferably, multiple contacts during the entry of a command have simultaneous sliding motions (that are the same or different). For example, the gesture may include sliding motion of two contacts towards each other, sliding motion of two contacts away from each other, or sliding contacts that are in generally the same direction. A sliding motion may be a generally small motion (e.g., within a control locations), a generally large motion (e.g., outside the control location or larger than a distance from the center to the edge of the control location).

The association between commands and gestures may include a first command associated with the sliding motion of only a first finger in a first direction and a second different command associated with the sliding motion of only a second finger in a second direction. The first and second directions may be the same (e.g., within about 30°, within about 20°, within about 15°, within about 10°, or within about 5°) or different (e.g., angled by more than 30°, angled by more than 40°, or angled by more than 50°).

The entry of a control command using a gesture may include one or more of the features of FIG. 12. A user may contact one or more of the control locations each with a different finger and then make a gesture on the touch sensitive surface while maintaining contact with the surface. The gesture is preferably associated with a predetermined control command. The process preferably includes a step of removing the fingers from the touch sensitive surface or other action for completing the entry of the gesture. After the completion of the entry of a gesture, another gesture may be entered. During the entering of a control command using a gesture, the processor or device generally identifies contact(s) with one or more control locations (e.g. after the control locations have been free of contact). The process or device then identifies the type of gesture(s) being made from the contacts. The process or device may identify the gesture as a continuous contact with the surface. After identifying a gesture, the processor or device may identify a predetermined control command associated with the entered gesture. Preferably, the control command is executed, sent, or otherwise acted upon. It will be appreciated that a control command may be associated with a single gesture or with a series of gestures. The processor or device may identify a gesture immediately upon contact, after one or more sliding motions, upon the removal of the contact from the surface, or after the completion of the entry of a gesture according to the teachings herein.

Each gesture entry includes a contact with one or more control locations (e.g., finger contact regions). The entry of a gesture may be completed by removing all of the fingers from the touch sensitive surface.

The entry of a gesture may be completed (e.g., timed out by a processor) after a predetermined time limit is exceeded from the contact with the control location(s). For example, the entry of a gesture may be completed after continuous contact with the touch screen surface for a predetermined time limit of about 0.5 seconds or more, about 1 second or more, about 1.5 seconds or more, about 2 seconds or more, about 3 seconds or more, or about 4 seconds or more. The predetermined time limit, if any, typically is about 100 seconds or less, about 30 seconds or less, about 15 seconds or less, about 10 seconds or less, or about 6 seconds or less.

The entry of a gesture may be completed (e.g., timed out by a processor) after a predetermined limit for the number of changes in direction of a sliding motion (i.e., the predetermined direction change limit) is reached. Here, the multiple sliding directions generally occur while the contact with the touch sensitive surface is maintained. As used herein, a change in direction may be a change of about 15° or more, about 45° or more, about 90° or more, about 135° or more, or about 180°. For example, the gesture may be completed after the processor identifies an initial sliding motion and then a first change in the direction of the sliding (i.e., the predetermined direction change limit is one). As another example, the gesture may be completed after the processor identifies a sliding motion in an initial direction, followed by a sliding motion in a second direction and then a sliding motion in a third direction (i.e., the predetermined direction change limit is two). The predetermined limit may be one or more, two or more, three or more, or four or more. Typically, the predetermined direction change limit will be 10 or less, or 5 or less.

The entry of a gesture may be completed (e.g., timed out by a processor) when the contact moves in a predetermined direction. The predetermined direction may be any direction. For example, the predetermined direction may be a generally upward direction, a generally downward direction, a generally rightward direction, or a generally leftward direction.

The entry of a gesture may be completed (e.g., timed out by a processor) when the contact returns to the finger contact region (or a position in the finger contact region) following a sliding motion away from the finger contact region.

The entry of a gesture may be completed (e.g., timed out by a processor) when the contact moves in a predetermined shape. For example, the entry of the gesture may be completed when the processor recognizes a sliding motion in a shape such as an arc, a semi-circle, a circle, a triangle, a rectangle, a square, a star, a letter, a number, or any combination thereof.

After a gesture is completed (e.g., after a processor determines that the entry of a gesture is completed), a next gesture may be entered by contacting one or more control location(s).

During the mode for entry of control commands, contacts with the control locations may deviate from the center of the control locations. It will be appreciated that such deviations may be systematic and/or represent a shift in a user's perception of the control location. To compensate for such changes, the mode for entry of control commands may include a mode for repositioning of the control locations. Instead of having a mode for repositioning of control locations, the control locations may remain fixed.

Mode for Repositioning Control Locations

Figure 13A:
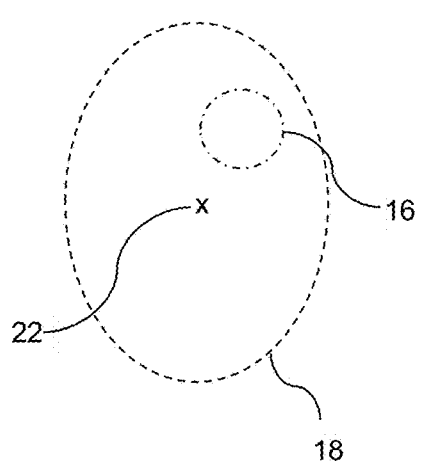
FIG. 13A is an illustrative drawing showing a contact with a finger contact region that is offset from the center point of the finger contact region.

During the mode for entry of a control command, the touch sensitive surface may be contacted at a point or region of contact 16 inside a control location 18 but offset from the center 22 of the control location 18, such as illustrated in FIG. 13A.

The processor or device may reposition the control location based at least partially on the offset distance and offset direction between the center of the contact 15 and the center 22 of the control location 18.

It will be appreciated that the repositioning may occur every time the contact is offset from the center of the control location, or only under certain conditions. For example, the offset distance must reach a threshold value prior to repositioning the control location. As another example, the offset must occur at a sufficient frequency prior to repositioning the control location.

The new control location may have the same size, or a different size as the prior control location. The new control location may have the same shape, or a different shape as the prior control location. The new control location preferably has the same size or the same shape as the prior control location. More preferably, the new control location has the same size and shape as the prior control location.

Figure 13B:
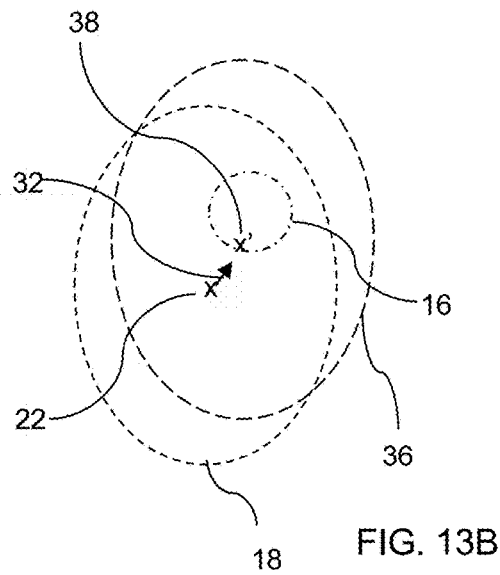
FIG. 13B is an illustrative drawing showing a previous (e.g. initial) finger contact region and a new finger contact region. The finger contact region may be repositioned based on the direction and/or distance between the previous (e.g., initial) center of the finger contact region and the location of contact recognized on the surface.

FIG. 13B illustrates the repositioning of a control location, showing the position of the new location and the position of the prior location. The new control location 36 may have a center 38 that is displaced from the center 22 of the prior control location 18. The direction of the displacement 32 preferably is about the same as the offset direction. The distance of the displacement between the prior center 22 and the new center 38 preferably is about the same as or less than the offset distance. For example, the distance between the prior center 22 and the new center 38 may be a percentage (preferably about 100% or less than 100%) of the offset distance.

It will be appreciated that the offset distance and offset direction for one contact location may be employed for repositioning one or more of the other contact locations.

The reposition of the finger contact region may include one or any combination of the steps illustrated in FIG. 14. The repositioning of a control location generally occurs after a contact is initiated in a control location. The repositioning of the control location may occur prior to a sliding motion of the contact, after a sliding motion of the contact, or after removal of the contact from the touch sensitive surface.

Figure 15:
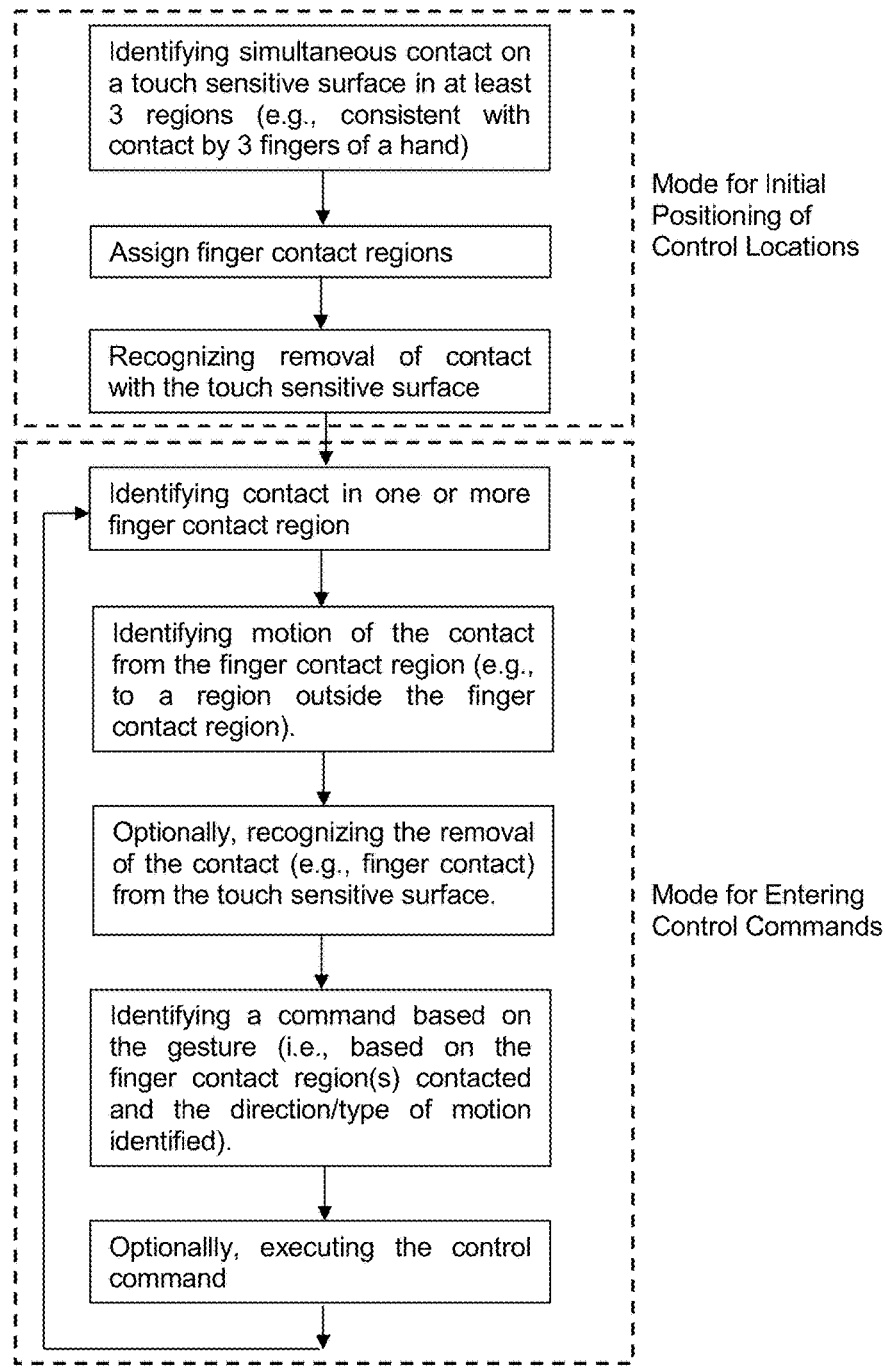
FIG. 15 is an illustrative flow diagram for entering one or more control commands. It will be appreciated that some of the steps may be eliminated and/or the order of the some of the steps may be changed. The process may also include additional steps.

The process may allow for repeated or continuous entry of different control commands. For example, after identifying the end of the entry of a control command, the process may be used for the entry of a subsequent control command, such as illustrated in FIG. 15. It will be appreciated that the step of the removal of the contact may be replaced by a step of identifying the end of an entry of a control command, such as described herein. It will also be appreciated that such a step of identify the end of an entry of a control command may occur (e.g., recognizing the removal of the finger contact from the touch sensitive surface) may occur after a step of identifying a command based on the gesture.

Orientation of Touch Sensitive Surface

Figure 16:
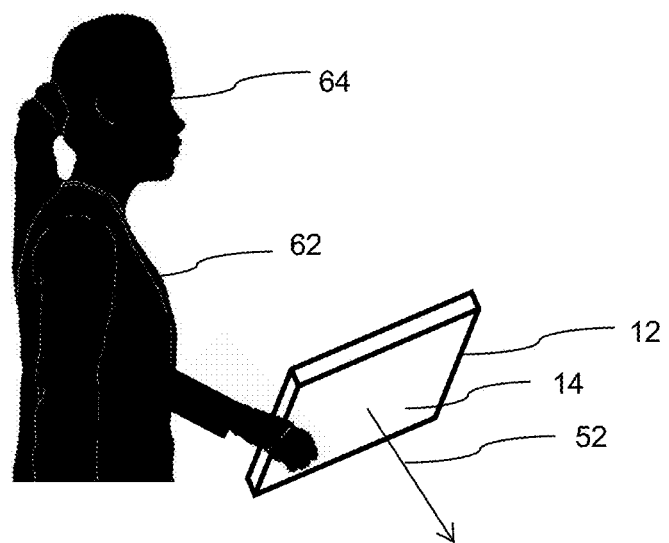
FIG. 16 is an illustrative drawing showing a touch sensitive surface facing away from a user.
Figure 17:
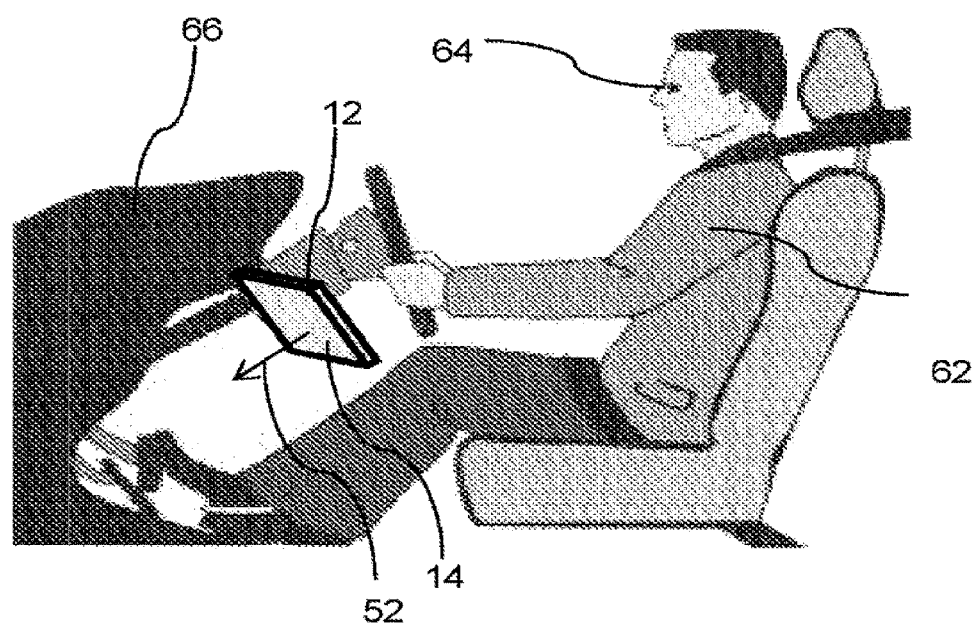
FIG. 17 is an illustrative drawing showing a touch sensitive surface in a vehicle facing away from a user.

The touch sensitive surface may be oriented in a direction and/or location that prevents viewing of the touch sensitive surface by a user. For example a user may be holding a device including a touch sensitive surface so that the touch sensitive surface is facing away from the user. With reference to FIG. 16, the user 62 may be holding the device 12, so that the touch sensitive surface 14 is directed away from the user's eye's 64. For example, the screen direction 52 perpendicular to and away from the touch sensitive surface 14 may partially or entirely be in a forward direction. As such, the screen display direction may be away from the user's eyes 64. With reference to FIG. 17, the user 62 may be a driver of a vehicle 66 and the touch sensitive device 14 may be mounted to the vehicle 66. Here, the touch sensitive surface is mounted so that the touch sensitive surface faces away from the eyes of the driver.

Figure 18:
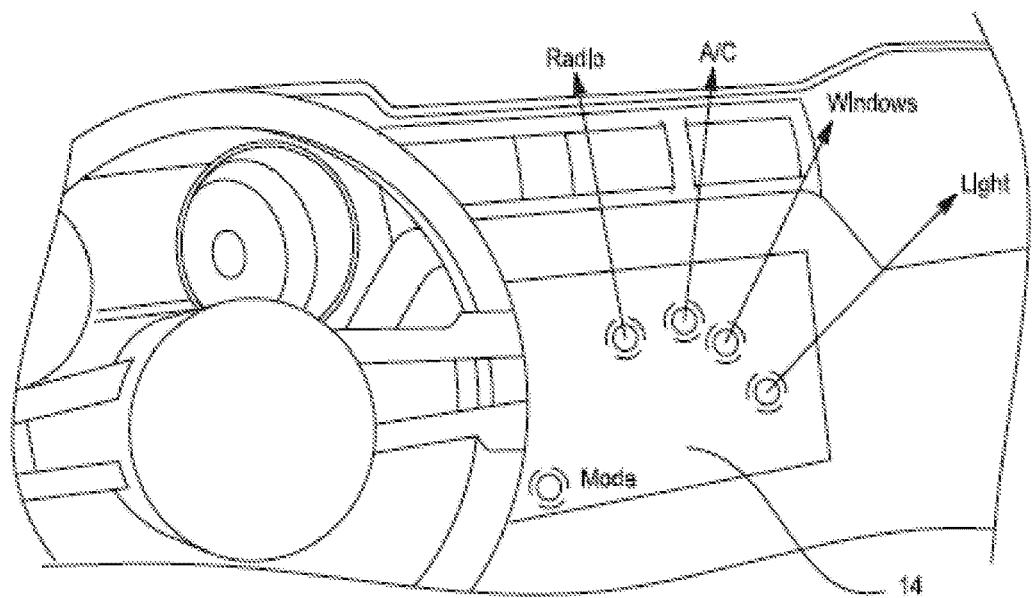
FIG. 18 is an illustrative drawing showing a touch sensitive surface in a motor vehicle facing towards a user. The ability to use "blind" control of this touch sensitive surface may reduce the level of distraction during its operation compared with a device requiring visual observation of control locations.

The touch sensitive surface may be oriented within the field of view of the user. However, operation and/or control of the device may be enhanced by setting control locations based on contact with the touch sensitive surface with three or more fingers. For example, as illustrated in FIG. 18, the touch sensitive surface may be in the field of view of the driver of a vehicle.

Figure 19A:
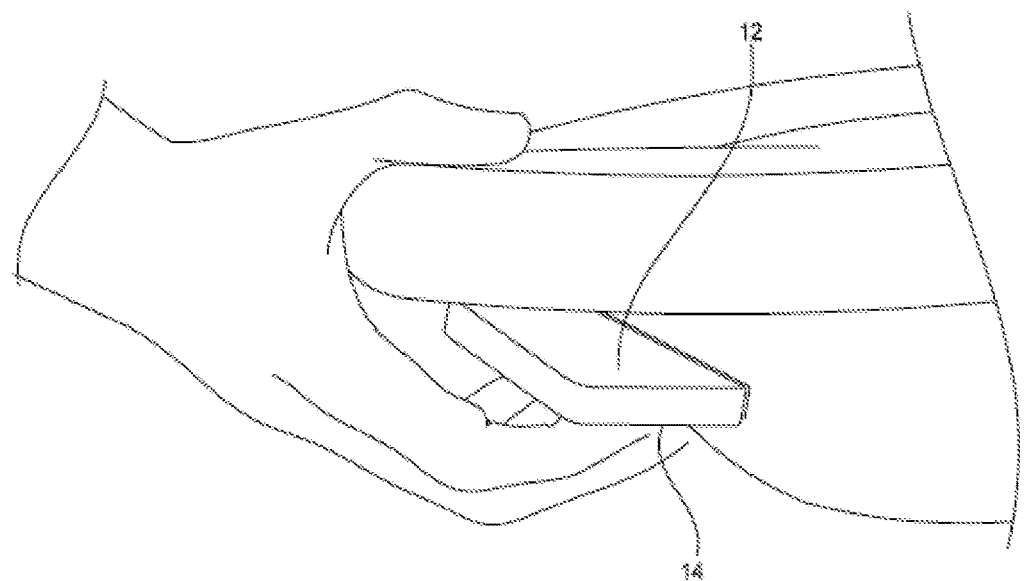
FIGS. 19A and 19B are drawings illustrating a device mounted to a steering wheel or a steering wheel column with a touch sensitive surface facing away from the driver.
Figure 19B:
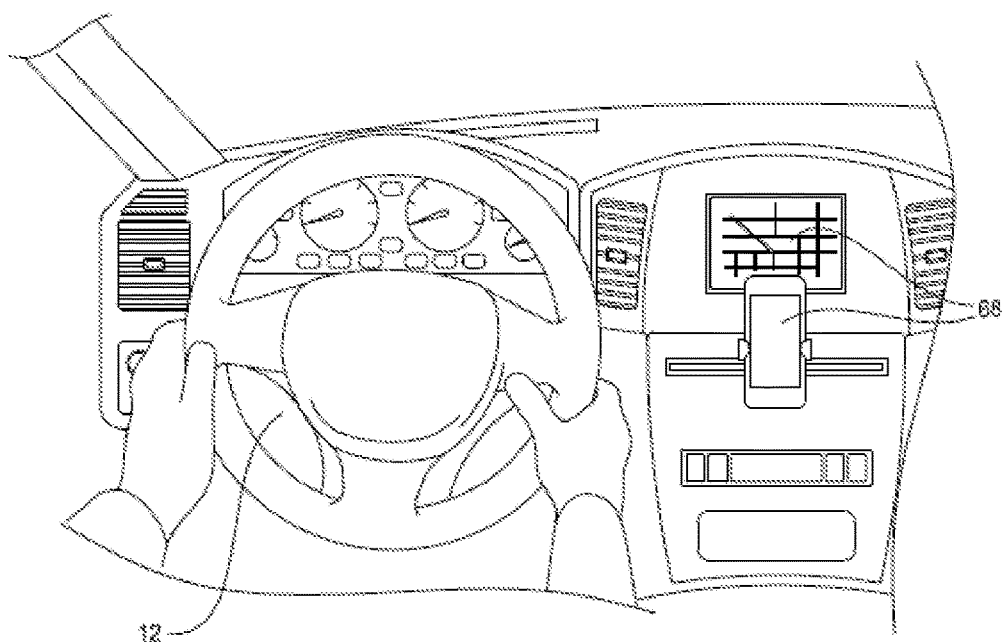

The touch sensitive surface may be mounted to, attached to, or integrated with a device positioned for contact by a user. For example, the touch sensitive surface may be located in a vehicle in proximity to a driver, and preferably at an ergonomic location. As an example, the touch sensitive surface may be mounted to a steering wheel and/or a steering column, such as illustrated in FIGS. 19A and 19B.

The devices and systems according to the teachings herein may include one or more view panels (e.g., a display panel that is not a touch sensitive display) for viewing the command functions available. A display panel may be on the same device as the touch sensitive surface, but on a different location. For example, a display panel and a touch sensitive surface may be on opposing sides of a device. A display panel may be on a different device as the touch sensitive surface. For example, a touch sensitive panel may be mounted on a steering wheel and a display panel may be a panel attached to or integrated with a dashboard of a vehicle. With reference to FIG. 19B, a display panel 68 may be a display of a mobile phone, or a vehicle display device. A view panel display may fade or turn-off after a pre-determined interval of inaction on the touch sensitive surface.

The device or system including the touch sensitive surface may include a control component for turning the device on or off, or for resetting the device. Control component may be a switch or other component capable of executing and/or communicating an on, off, or reset function.

The device or systems may include one or more features for disabling the touch sensitive surface. Such a disabling feature may be particularly useful in a vehicle when it may be desirable to disable the operation of the device and systems based on vehicle operating conditions. For example, the touch sensitive surface may be disabled when the vehicle is turning and/or has recently changed directions, is driving above certain speeds, etc.

The touch sensitive devices according to the teachings herein may include a grip for spreading the fingers towards different locations on the touch sensitive surface.

The control commands according to the teachings herein may be employed for controlling an air conditioning, a radio, a window, a light, a lock, a cruise control, an application on a mobile phone, a navigation control, the location of a cursor, a mechanical device, an electronic device, operation of a land vehicle, operation of a water vehicle, operation of an air vehicle, remote operation of a vehicle or other device, a communication device, or any combination thereof. As used herein, a control command includes providing an API or code to enable two computer systems to interact, such as a smart phone and an automobile computer system.

Entry of a Passcode

The devices, methods, systems and apparatus according to the teachings herein may be employed for entering a passcode for unlocking a device. Here, the passcode may consist of a sequence of gestures each employing one or more contacts with the finger contact regions. When unlocking the device, the touch sensitive surface is simultaneously contacted with three or more fingers for assigning the finger contact regions based on the locations of the contacts. The user may then enter a passcode by contacting the finger contact regions for entering a series of gestures. By way of example, the passcode may be a series of 2 or more gestures, 4 or more gestures, 6 or more gestures, or 8 or more gestures. Each gesture may be the same or different from the previous gesture. Each gesture may employ the same or different finger contact regions as the previous gesture. Each gesture may employ the same number of fingers or a different number of fingers as the previous gesture. For example, the passcode may include one gesture requiring the sliding movement of one, two, or more fingers in the same direction, the passcode may include the sliding movement of two fingers towards each other, the passcode may include the simultaneous tapping of one, two, or more finger contact regions, or any combination thereof. For purposes of illustration, a passcode may be entered by first contacting the touch sensitive surface simultaneously with a first, second, third, and fourth finger for assigning a finger contact region for each of the four fingers, followed by a first gesture entry of a sliding the first finger to the right, followed by a second gesture of sliding the third and fourth fingers together, followed by a third gesture of sliding the first, second, and third fingers in an upward direction, followed by a fourth gesture of tapping the surface with the fourth finger. It will be appreciated that the large number of possible gestures will result in more secure passcodes and/or reduce the number of entries required to obtain a secure passcode. It will also be appreciated that the passcode can be entered at different locations on the touch screen surface, reducing the possibility that evidence of the touch passcode will remain on the screen after repeated entries of the passcode over time.

Preferred passcodes include two or more sequential gestures in different directions. Preferred passcodes include two or more sequential gestures using different finger contact regions or different combinations of finger contact regions.

When entering a passcode, the processor may recognize the sequential contact of the touch sensitive surface at three or more locations, consistent with the contacting of the surface with three or more fingers and then assigning the finger contact locations based on the locations of contact. The number of simultaneous contacts for assigning the finger contact regions may be a predetermined number, such as 3, 4, 5, 6, 7, 8, 9, or 10. After the processor identifies that the multiple simultaneous contacts are removed from the surface, the processor may monitor the surface for a contact and gesture consistent with a first gesture of a predetermined passcode.

The system may include a mode of setting or resetting a passcode. The setting or resetting of the passcode may include simultaneously contacting the touch sensitive surface with three or more fingers for assigning the finger contact regions, followed by the sequential entry of the gestures of passcode. The system may require re-entry of the passcode to confirm the passcode. The system may store the passcode. The passcode may be encrypted by the system. The system may delete prior passcodes.

The touch sensitive surface may be attached to a vehicle. The touch screen surface in a vehicle may be proximate the driver's seat and/or the driver of the vehicle. A touch screen surface for use by a passenger may be proximate the location of one or more passenger seats and/or one or more passengers of a vehicle. For example, the touch screen device in a vehicle may be connected to the steering wheel, the steering wheel column, the dashboard, a seat back, a pillar, a door, or any combination thereof.

The touch screen surface may be in communicative connection with one or more devices to be controlled. For example, the touch screen surface may be in communicative connection with a control processor of the vehicle.

The touch sensitive surface may be oriented face down (out of view of the driver or other user). The touch sensitive surface may be part of a device or connected to a device adapted to track movements by multiple individually identified fingers.

The touch sensitive surface may be positioned so that a vehicle driver can contact the surface with one or more fingers without removing his hands from the steering wheel.

The touch sensitive surface may be associated with an apparatus software (e.g., an application) that identifies and/or tracks multiple contacts of the surface. The apparatus software may be running on a computer system. The apparatus software may be adapted to identify finger generated contact, finger generated gestures or both. The apparatus software may be adapted to identify multiple (preferably three or more, four or more, or five or more) simultaneous finger generated contact, multiple finger generated gestures, or both.

Data Entry Device/Game Controller

Figure 20A:
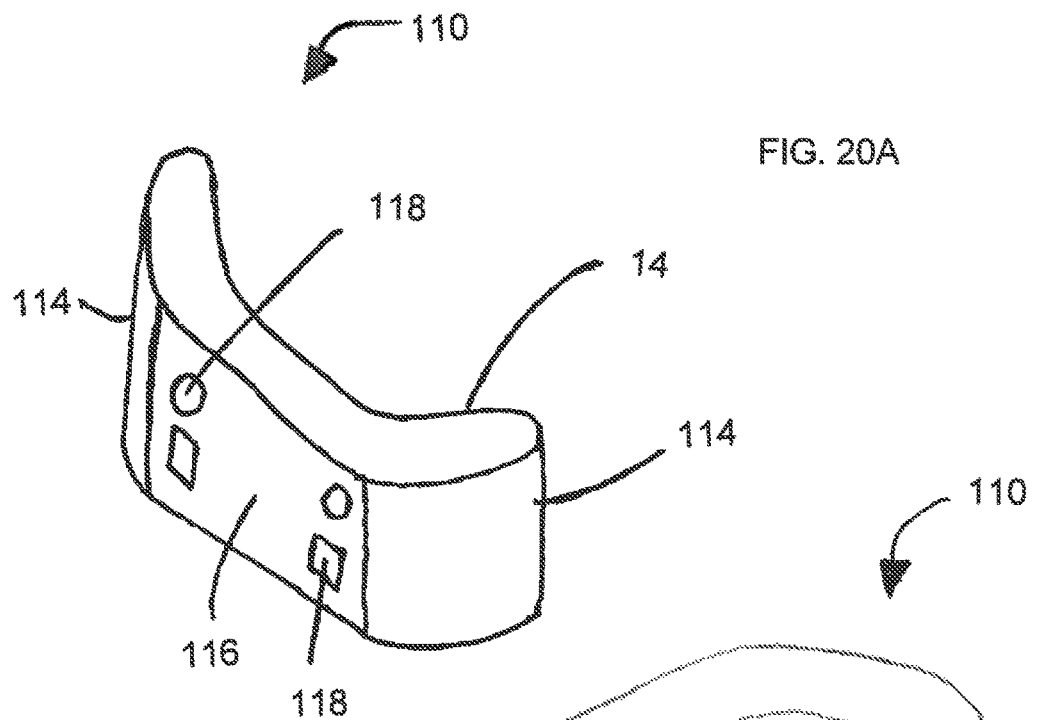
FIGS. 20A, 20B, 20C, and 20D are drawings of an illustrative game controller having one or more touch sensitive surfaces (e.g., on a concave surface of the game controller).
Figure 20B:
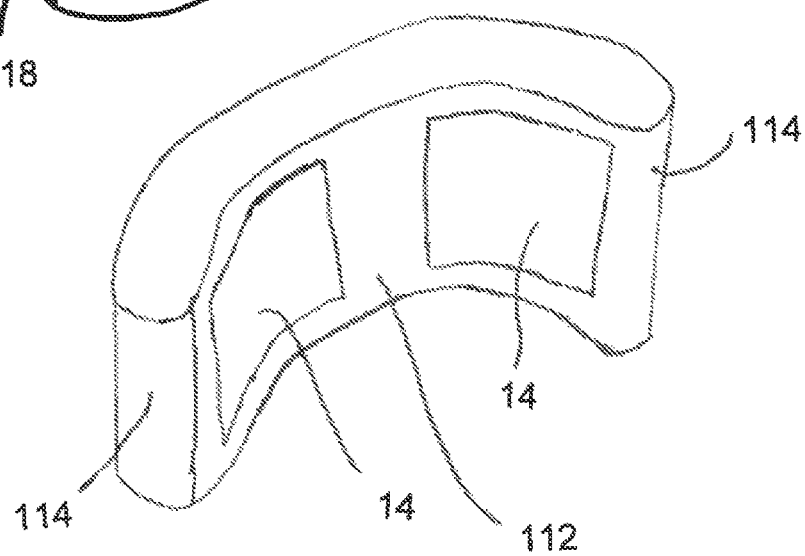
Figure 20C:
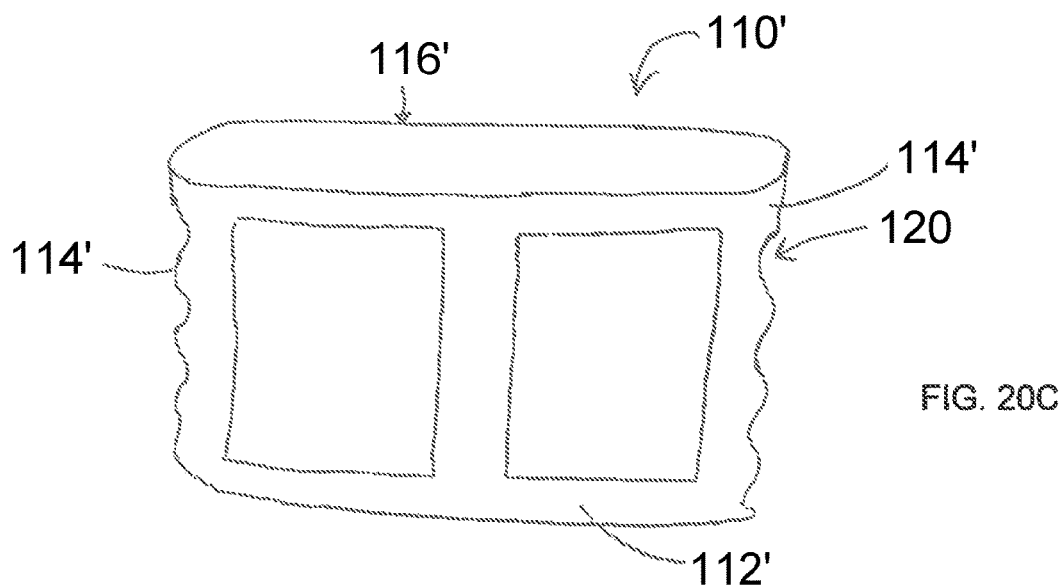
Figure 20D:
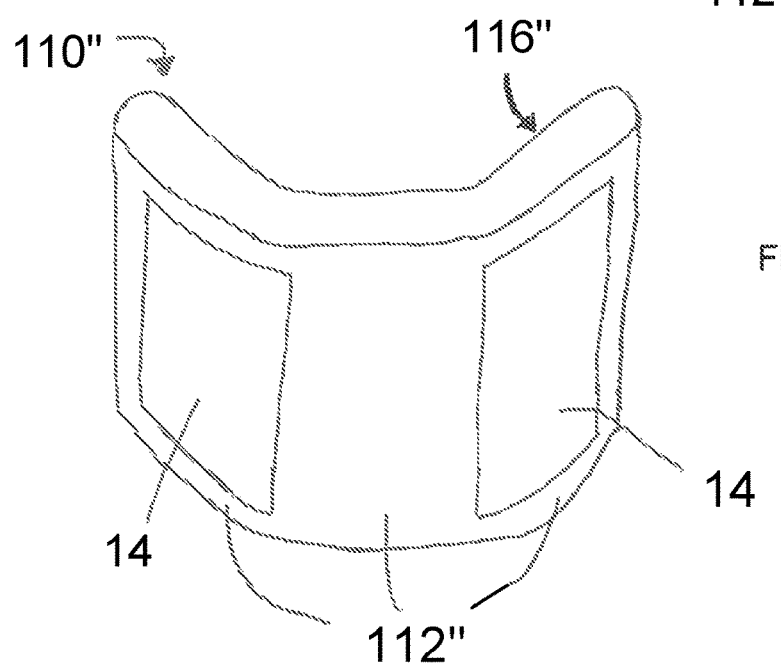

The methods, systems, and apparatus according to the teachings herein may be employed in a data entry device, such as a handheld data entry device. For example, the data entry device may be a device for controlling the operation of an application, a processor, a connected device or a remote device. By way of illustration, the data entry device may be a device for controlling (e.g., remotely controlling) a video game, a machine, a vehicle, a flying device, a robotic device, or any combination thereof. As an example, the data entry device may be a game controller. A handheld device, such as a game controller may have one or any combination of the features illustrated in FIG. 20A and FIG. 20B. With reference to FIG. 20A and FIG. 20B, the handheld device 110 may have a forward surface 112 and an opposing rearward surface 116. The forward surface may include one or more touch sensitive surfaces 14. With reference to FIG. 20B, the forward surface 112 of the device 110 may include a touch sensitive surface for the fingers of a user's right hand and a second touch sensitive surface for the fingers of a user's left hand. It will be appreciated that the forward facing surface may have a single touch sensitive surface sufficiently large for receiving simultaneous contacts from fingers of both hands. The touch sensitive surface 14 on the forward facing surface 112 of the device preferably is sufficiently large for contacting with three or more spaced apart fingers of a hand. The device preferably has a sufficient number and size of touch sensitive surfaces for contact with 4 or more fingers, 6 or more fingers or 8 or more fingers. The rearward surface may include one or more thumb controls, such as a button, a knob, a dial, a joystick, or a rollerball capable of being controlled by a thumb, while the fingers rest on the forward surface. With reference to FIG. 20A, the device 110 may include one or more (e.g., two or more) thumb controls for a left hand, one or more (e.g., two or more) thumb controls 118 for a right hand, or both. The device has side surfaces 114 connecting the forward and rearward surfaces. The side surfaces 114 preferably are adapted for receiving a palm of a hand. The side surfaces 114 may be rounded or otherwise curved. The device 110 may include a gripping feature for assisting in the placement of the fingers and/or making the device easier to grip. An example of a gripping feature 120 is shown in FIG. 20C. The forward surface 112, 112', 112" may be generally concave, generally planar, or generally convex. Preferably, the forward surface 112" is generally convex, and the rearward surface is generally concave, such as illustrated in FIG. 20D, resulting in a more natural placement of the side surfaces 114 between the thumb and fingers.

It will be appreciated that during any of the aforementioned modes (e.g., a mode for initial position of control locations, a mode for repositioning of control locations, or a mode for entry of a control command), one or more of the contacts of the touch sensitive surface (e.g., by contact with one or multiple fingers) may be replaced by a sensing of the locations of the multiple fingers. For example, the locations of the fingers may be identified by light (e.g., laser light) or other forms of radiation, electrical fields, magnetic fields, darkness level (e.g., a shadow), or any combination thereof. It will be appreciated that a glove or other device may be placed on one or more fingers to enable the identification of the location of the finger and/or to enhance the aforementioned observation of the location of the finger. Similarly, a gesture on the surface of the device may be sensed by one of the aforementioned means, with or without actual contact with the surface. Preferably any such sensing occurs while the finger is at least near the touch sensitive surface (e.g., about 30 mm or less, about 10 mm or less, about 3 mm or less, or about 1 mm or less from the surface). A sensing may be completed when the finger moves away from the surface. For example, the end of a mode or entry of a command may be completed when it is sensed that a finger is no longer near the touch sensitive surface (e.g., further than 1 mm, 3 mm, 10 mm, or 30 mm from the surface, or when the distance from the surface has increased by at least about 1 mm, about 3 mm, about 5 mm, about 10 mm, or about 20 mm).

One or more of the aforementioned modes may be completed (e.g., timed out by a processor) after a predetermined time limit is exceeded from one or any combination of the following: i) one or more contacts with the touch sensitive surface; ii) the sensing of one or more objects (e.g., fingers) above the touch sensitive surface); iii) the removal of one or more contacts from the touch sensitive surface; or iv) the sensing of the movement of one or more objects (e.g., fingers) away from the touch sensitive surface. Preferably, the predetermined time limit, if any, is about 0.5 seconds or more, about 1 second or more, about 1.5 seconds or more, about 2 seconds or more, about 3 seconds or more, or about 4 seconds or more. Preferably the predetermined time limit, if any, is about 100 seconds or less, about 30 seconds or less, about 15 seconds or less, about 10 seconds or less, or about 6 seconds or less. A predetermined time limit may be fixed, may be adjusted (e.g., based on experience or historical values, or set by a user).

The transition from a mode for initial position of control locations to a mode for entry of control commands may be triggered by a trigger event. The trigger event may be a predetermined time limit, such as described herein. The trigger event may be the sensing of the removal of one or more objects (e.g., fingers) away from the touch sensitive surface. The trigger event may require the processor to sense that exactly one of the objects (e.g., one finger) remains on or near the touch sensitive surface while the other objects are moved away from the touch sensitive surface.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Control Session
4 Mode for initial positioning of control locations (e.g., initial finger contact locations)
6 Mode for entering control commands
7 Control command
8 Mode for repositioning control locations
9 Ending a control session
10 Simultaneous contact of touch sensitive surface
12 Touch sensitive device
14 Touch sensitive surface
16 Point/region of contact of touch sensitive surface
17 Arch (e.g., natural arch of spaced apart fingertips)
18 Finger contact region
20 Removal of some or all of the fingers from the touch sensitive surface
22 Center of the finger contact region
24 Finger
30 Assignment of finger contact regions
32 Direction for changing the finger contact region
34 Gesture direction or sliding direction while contacting the surface
36 New finger contact region
38 New center of finger contact region
40 Command entry contact (contacting a touch sensitive surface after establishing finger contact regions).
52 View direction of the touch sensitive surface (e.g., normal to the plane of the surface)
62 User of touch sensitive surface
64 User's eyes
66 Automotive vehicle
68 Display panel
72 base finger contact regions
74 secondary finger contact regions
82 First direction on touch sensitive surface (e.g., upward direction)
84 Second direction on touch sensitive surface (e.g., downward direction)
86 Third direction on touch sensitive surface (e.g., rightward direction)
88 Fourth direction on touch sensitive surface (e.g., leftward direction)
90 Mode for setting initial control locations (e.g., initial finger contact regions)
92 Mode for entering control commands
94 Mode for repositioning control locations
110 Game controller
112 Forward Surface (e.g., away from user)
114 Side Surface
116 Rearward Surface (e.g., towards user)
118 Thumb Control
120 Gripping Feature

What is claimed is:

1. A method of entering a command comprising the steps of:
   i. a processor connected to a touch sensitive surface sensing a simultaneously positioning of exactly three or four objects above and near or on the touch sensitive surface each at a different sensing locations, including a positioning centered at a first finger initial sensing point, a positioning centered at a second finger initial sensing point, and a positioning centered at a third finger initial sensing point;
   ii. the processor assigning a finger location region for two or more of the three or four objects, wherein each finger location region is a distinct region of the touch sensitive surface, and each finger location region includes one of the finger initial sensing points;
   iii. the processor entering a command entry mode following the step of assigning the finger location regions, wherein the command entry mode includes an association having at least a first command associated with a movement of only one of the objects starting at a first finger location region and a second command different from the first command associated with a movement of only one of the objects starting at a second finger location region; and
   iv. the processor recognizing a gesture on the touch sensitive surface including sensing the movement of only one of the objects starting at the first finger location region and identifying the associated first command based on the gesture;
   wherein the finger location regions are assigned only after the sensing of the position of the three or four objects in step i; the touch sensitive surface is in a vehicle facing away from a driver; and one of the objects remain on the touch sensitive surface from the assignment of the finger location regions through the entry of the first command with the gesture.

2. The method of claim 1, wherein the method includes executing the control command for controlling a device.

3. The method of claim 2, wherein the touch sensitive surface is a surface of a pure entry device that is not a display surface.

4. The method of claim 3, wherein the touch sensitive surface is attached to a steering wheel.

5. The method of claim 4, wherein a second touch sensitive surface is attached to the steering wheel.

6. A method of entering a command comprising the steps of:
   i. a processor connected to a touch sensitive surface sensing a simultaneously positioning of three or more objects above and near or on the touch sensitive surface at three or more different sensing locations, including a positioning centered at a first finger initial sensing point, a positioning centered at a second finger initial sensing point, and a positioning centered at a third finger initial sensing point;
   ii. the processor assigning a finger location region for two or more of the three or more objects, wherein each finger location region is a distinct region of the touch sensitive surface, and each finger location region includes one of the finger initial sensing points;
   iii. the processor entering a command entry mode following the step of assigning the finger location regions, wherein the command entry mode includes an association having at least a first command associated with a movement of only one of the objects starting at a first finger location region and a second command different from the first command associated with a movement of only one of the objects starting at a second finger location region; and iv. the processor recognizing a gesture on the touch sensitive surface including sensing the movement of only one of the objects starting at the first finger location region and identifying the associated first command based on the gesture;

wherein during the command entry mode the processor recognizing an entry positioning of an object within the first finger location region centered at a first finger offset sensing point different from the first finger initial sensing point, and the method includes a step of relocating the first finger location region.

7. The method of claim 6, wherein the method includes the processor recognizing a gesture on the touch sensitive surface including the movement of only one of the objects starting at the second finger location region and identifying the associated second command based on the gesture.

8. The method of claim 6, wherein the command entry mode is started after a predetermined time interval from the processor sensing the simultaneous positioning of the three or more objects.

9. The method of claim 6, wherein the command entry mode is started after the processor identifies the removal of one or more of the objects.

10. The method of claim 9, wherein the command entry mode is started after the processor identifies the removal of all except for one of the objects.

11. The method of claim 10, wherein the processor senses a continuous contact between one of the objects and the touch sensitive surface from the sensing of the positioning of the object to the sensing the gesture made with the object.

12. The method of claim 11, wherein a third entry command different from the first and second entry commands is associated with a different movement of only one of the objects starting at the first finger location region.

13. The method of claim 6, wherein the touch sensitive surface is a surface of a pure entry device that.

14. The method of any of claim 6, wherein the touch sensitive surface is oriented so that the surface faces away from a user.

15. The method of claim 6, wherein the method includes executing the control command for controlling a device.

16. The method of claim 6, wherein the first finger location region has a geometric center and the step of relocating the first finger relocation region includes moving the geometric center of the first finger location region towards the first finger offset sensing point.

17. The method of claim 6, wherein the method includes one or more of the following features:
    i) the three or more objects are fingers;
    ii) the step of sensing the simultaneous position occurs when the objects are 10 mm or less from the touch sensitive surface;
    iii) the three or more different sensing locations are consistent with the positioning of three or more fingers of a hand;
    iv) the processor assigns a finger location region for each of the objects;
    v) each finger location region corresponds to only one of the fingers;
    vi) the command entry mode is started after a transition event; or
    vii) the transition event is either the processor sensing the removal of all except one of the objects from the touch sensitive surface or a predetermined time interval is reached after the sensing of the positioning of the objects.

18. The method of claim 6, wherein an entry command controls a device selected from a radio, a phone, a telecommunication device, a heating and/or air conditioning system, a motor, a remote device connected via an internet connection, a device for controlling an internet application, a device for entry commands into a video game, and a light.

19. The method of claim 6, wherein each position on the touch sensitive surface is within at most one of the finger location regions.

20. A method of entering a control command comprising the steps of:
    i. identifying a simultaneously contact on a touch sensitive surface at three or more different contact locations, including a contact centered at a first finger initial contact point, a contact centered at a second finger initial contact point, and a contact centered at a third finger initial contact point;
    ii. assigning a finger contact region for each of the three or more fingers, wherein each finger contact region is a different region of the touch sensitive surface, and each finger contact region includes one of the initial contact points;
    iii. recognizing the removing of the contact of the touch sensitive surface at one or more of contact locations; and
    iv. recognizing an entry contact at one of the finger contact regions followed by a sliding movement of the entry contact in one or more contact movement directions, and moving a cursor on a display in a corresponding one or more cursor movement directions;

wherein the method includes:
the processor recognizing
i) a single contact on the touch sensitive surface in a single one of the finger contact regions,
ii) a movement of the single contact in one or more directions for selecting an application to control, and
iii) removal of the single contact from the touch sensitive surface;
the processor selecting the application to control based on the finger contact region and the movement;
the processor recognizing:
i) a different single contact on the touch sensitive surface in a different one of the finger contact regions,
ii) a movement of the different single contact in one or more directions for selecting a control of the application, and
iii) a removal of the different single contact from the touch sensitive surface; and the processor selecting the control of the application based on the location of the different single contact and the movement of the different single contact.

21. A system for entry of control commands for controlling a device comprising:
an entry device including a touch sensitive surface;
a processor connected to the touch sensitive surface;
a memory storing instruction that, when executed by the processor causes the processor to:
i. sensing a simultaneously positioning of three or more objects above and near or on the touch sensitive surface at three or more different sensing locations, including a sensing centered at a first finger initial sensing point, a sensing centered at a second finger initial sensing point, and a sensing centered at a third finger initial sensing point;

ii. assign a finger location region for two or more of the three or more objects, wherein each finger location region is a distinct region of the touch sensitive surface, and each finger location region includes one of the finger initial sensing points;

iii. enter a command entry mode following a predetermined event, wherein the command entry mode includes an association of at least a first entry command associated with a movement of only one of the objects starting at a first finger location region and a second different entry command associated with generally the same movement of a different one of the objects starting at a second finger location region; and iv. recognizing a gesture on the touch sensitive surface including sensing the movement of only one of the objects starting at the first finger location region and identifying the associated entry command based on the finger location and the movement;

wherein during the command entry mode upon the processor recognizing an entry positioning of an object within the first finger location region centered at a first finger offset sensing point different from the first finger initial sensing point, the processor relocates the first finger location region.

* * * * *